US012432556B2

(12) United States Patent
Wang

(10) Patent No.: US 12,432,556 B2
(45) Date of Patent: Sep. 30, 2025

(54) BLUETOOTH NODE PAIRING METHOD AND RELATED APPARATUS

(71) Applicant: HUAWEI TECHNOLOGIES CO., LTD., Guangdong (CN)

(72) Inventor: Yong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 18/157,318

(22) Filed: Jan. 20, 2023

(65) Prior Publication Data
US 2023/0164560 A1 May 25, 2023

Related U.S. Application Data

(63) Continuation of application No. PCT/CN2020/105274, filed on Jul. 28, 2020.

(51) Int. Cl.
H04W 12/069 (2021.01)
H04W 12/50 (2021.01)
H04W 76/10 (2018.01)

(52) U.S. Cl.
CPC ......... *H04W 12/069* (2021.01); *H04W 12/50* (2021.01); *H04W 76/10* (2018.02)

(58) Field of Classification Search
None
See application file for complete search history.

(56) References Cited

U.S. PATENT DOCUMENTS

| 10,129,228 | B1* | 11/2018 | Mobarak | H04L 63/083 |
| 10,326,797 | B1* | 6/2019 | Murray | H04L 9/0825 |
| 2008/0133918 | A1 | 6/2008 | You et al. | |
| 2018/0338330 | A1 | 11/2018 | Ledvina et al. | |
| 2019/0281453 | A1 | 9/2019 | Shi et al. | |
| 2020/0196122 | A1 | 6/2020 | Junk et al. | |

FOREIGN PATENT DOCUMENTS

| CN | 102065412 A | 5/2011 |
| CN | 103795728 A | 5/2014 |
| CN | 107465994 A | 12/2017 |
| CN | 108496333 A | 9/2018 |
| CN | 109587518 A | 4/2019 |
| CN | 109905869 A | 6/2019 |

(Continued)

OTHER PUBLICATIONS

Notice of Allowance in Japanese Appln. No. 2023-505813, mailed on Sep. 10, 2024, 5 pages (with English Translation).

(Continued)

*Primary Examiner* — Frantz Bataille
(74) *Attorney, Agent, or Firm* — Fish & Richardson P.C.

(57) ABSTRACT

In an example method, a second node receives a pairing request message from a first node. The pairing request message includes information used to indicate whether the first node has a pre-shared key (PSK) pairing capability. The second node sends a pairing response message to the first node in response to that the pairing request message includes information used to indicate that the first node has the PSK pairing capability. The pairing response message is used to indicate to perform pairing by using a shared first PSK. The second node authenticates the first node based on the first PSK.

40 Claims, 12 Drawing Sheets

(56) References Cited

FOREIGN PATENT DOCUMENTS

JP      2016526356 A    9/2016
WO      2015122289 A1   8/2015

OTHER PUBLICATIONS

Bluetooth SIG Proprietary, "Bluetooth Core Specification v5.1," Jan. 21, 2019, 2985 pages.
Office Action in Japanese Appln. No. 2023-505813, mailed on Apr. 9, 2024, 12 pages (with English translation).
Extended European Search Report in European Appln. No. 20946779.4, mailed on Aug. 11, 2023, 6 pages.
Action in Korean Appln. No. 10-2023-7005565, mailed on Jul. 3, 2024, 17 pages (with English translation).
Office Action in Japanese Appln. No. 2024-177803, mailed on Jul. 15, 2025, 4 pages (with English translation).

\* cited by examiner

| I/O capability of a first node | | | | | | |
|---|---|---|---|---|---|---|
| | | DisplayOnly | DisplayYesNo | KeyboardOnly | NoInputNoOutput | KeyboardDisplay |
| I/O capability of a second node | DisplayOnly | Just work | Just work | Passkey entry | Just work | Passkey entry |
| | DisplayYesNo | Just work | Numeric comparison | Passkey entry | Just work | Numeric comparison |
| | KeyboardOnly | Passkey entry | Passkey entry | Passkey entry | Just work | Passkey entry |
| | NoInputNoOutput | Just work | Just work | Just work | Just work | Just work |
| | KeyboardDisplay | Passkey entry | Numeric comparison | Passkey entry | Just work | Numeric comparison |

FIG. 6

BLUETOOTH NODE PAIRING METHOD AND RELATED APPARATUS

CROSS-REFERENCE TO RELATED APPLICATIONS

This application is a continuation of International Application No. PCT/CN2020/105274, filed on Jul. 28, 2020, the disclosure of which is hereby incorporated by reference in its entirety.

TECHNICAL FIELD

The present application relates to the field of communication technologies and connected vehicle technologies, and in particular, to a Bluetooth node pairing method and a related apparatus, for example, Bluetooth communication in a cockpit domain.

BACKGROUND

With the rapid development of informatization, communication technologies have been widely used in people's lives. While enjoying convenient communication, people are also threatened by security vulnerabilities and privacy leakage. An intelligent vehicle is used as an example. With wide application of vehicle communication, communication may be performed between the vehicle and another device and between components inside the vehicle by using a wireless communication technology. Generally, before two nodes perform wireless communication, an association relationship needs to be established between the two nodes. This process of establishing the association relationship may also be referred to as a node pairing process.

In a pairing process of two Bluetooth nodes, there are the following four modes: numeric comparison, just work, passkey entry, and out of band. The pairing mode is related to an input/output capability of a node. For a NoInputNoOutput node, a DisplayOnly node, or a DisplayYesNo node, only the just work mode or the numeric comparison mode can be used for pairing in most cases. In such a pairing mode, node security is easily threatened. For example, when a mobile phone is paired with a Bluetooth headset, because the headset cannot enter a passkey or display a screen, the headset can be connected only in the just work mode, that is, the headset is connected by directly tapping a name of the Bluetooth headset on the mobile phone. In such a pairing mode, an attacker may easily attack a node by using a device connected in the just work mode, or an attacker may attack a node that can be connected only in the just work mode, which greatly threatens user privacy and vehicle security. Especially for an in-vehicle communication system, this situation is likely to cause an untrusted connection to a vehicle, leads to communication between the vehicle and an untrusted attacker, and even endangers safety of the driver and passengers.

Therefore, how to improve security in a Bluetooth pairing process and prevent a node from connecting to an untrusted device is a problem being studied by a person skilled in the art.

SUMMARY

Embodiments of this application disclose a Bluetooth node pairing method and a related apparatus, to improve security in a node pairing process, and prevent a node from connecting to an untrusted device.

According to a first aspect, an embodiment of this application discloses a Bluetooth node pairing method, including:

A second node receives a pairing request message from a first node. The pairing request message includes information used to indicate whether the first node has a pre-shared key (PSK) pairing capability.

The second node sends a pairing response message to the first node in response to the fact that the pairing request message includes information used to indicate that the first node has the PSK pairing capability. The pairing response message is used to indicate to perform pairing by using a first PSK shared by the first node and the second node.

The second node authenticates the first node based on the first PSK.

A PSK is a secret value shared by the first node and the second node. In this embodiment of this application, a PSK shared with the second node is predefined or configured on the first node. Therefore, the pairing request message may include the information indicating that the first node has the PSK pairing capability. Correspondingly, a PSK (referred to as the first PSK for ease of description) shared with the first node is also predefined or preconfigured on the second node. The second node may authenticate the first node based on the first PSK, to determine that an identity of the first node is trusted, so that subsequent pairing can be successful. In this way, an identity of a node for which a PSK is preconfigured or defined is usually trusted. This avoids successful pairing between the second node and an untrusted node, and improves security in a node pairing process.

In a possible implementation of the first aspect, the first node is a NoInputNoOutput Bluetooth node, a DisplayOnly Bluetooth node, or a DisplayYesNo Bluetooth node.

An existing NoInputNoOutput Bluetooth node can be paired with the second node only in a just work mode. The DisplayOnly Bluetooth node or the DisplayYesNo Bluetooth node does not have an input/output capability. Therefore, if the second node does not have an input/output capability, the second node is also connected in the just work mode. Because the just work mode has low security, in such pairing, an attacker can easily attack the second node by using the first node. Therefore, for the foregoing three types of nodes, pairing may be performed by using a PSK, to improve security of node pairing. Certainly, for a node having an input/output capability, pairing may be performed by entering a passkey, or pairing may be performed by using a PSK.

In another possible implementation of the first aspect, the method further includes:

The second node determines that the second node shares the first PSK with the first node.

In still another possible implementation of the first aspect, that the second node determines that the second node shares the first PSK with the first node includes:

The second node obtains a first device identifier of the first node.

The second node determines that the first PSK corresponding to the first device identifier exists.

In still another possible implementation of the first aspect, the pairing request message includes an input/output capability IOC field, and the IOC field includes the information used to indicate whether the first node has a PSK pairing capability.

The foregoing describes a data form of the pairing request message. It can be learned that a value in the IOC field may represent the information about whether the first node has a PSK pairing capability, or whether the first PSK shared with the second node exists on the first node. For example, when the IOC field is 0x05, it may indicate that the first node has the PSK pairing capability.

In still another possible implementation of the first aspect, one part of bits in the IOC field include a PSK capability value of the first node, and the PSK capability value of the first node is used to indicate whether the first node has the PSK pairing capability.

Another part of bits in the IOC field are used to indicate an input/output capability of the first node.

The foregoing describes another data form of the pairing request message. It can be learned that one part of bits in the IOC field include the PSK capability value of the first node. For example, the IOC field may include eight bits. Two bits include the PSK capability value of the first node, and the PSK capability value is used to indicate whether the first node has the PSK pairing capability. For example, "01" indicates that the first node has the PSK pairing capability or that the first PSK shared with the second node exists. Therefore, PSK-based pairing may be supported. For another example, "00" indicates that the first node does not have the PSK pairing capability or that the first PSK shared with the second node does not exist. In this case, PSK-based pairing is not supported, and pairing needs to be performed in another mode.

Further, another part of bits in the IOC field are used to indicate the input/output capability of the first node, so that the second node can determine a pairing mode based on the input/output capability of the first node. For example, a value of six bits in the IOC field is 0x01, indicating that the input/output capability of the first node is DisplayOnly. If the input/output capability of the second node is KeyboardDisplay, matching may be performed between the first node and the second node in a passkey entry (PE) mode.

In still another possible implementation of the first aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

The foregoing describes still another data form of the pairing request message. It can be learned that the PSK capability field is used to indicate the PSK capability value of the first node. For example, 0x01 indicates that the first node has the PSK pairing capability or that the first PSK shared with the second node exists. Therefore, PSK-based pairing may be supported. For another example, 0x00 indicates that the first node does not have the PSK pairing capability, or the first PSK shared with the second node does not exist. In this case, PSK-based pairing is not supported, and pairing needs to be performed in another mode.

Further, the IOC field is used to indicate the input/output capability of the first node, so that the second node can determine a pairing mode based on the input/output capability of the first node. For example, a value of the IOC field is 0x01, indicating that the input/output capability of the first node is DisplayOnly. If the input/output capability of the second node is KeyboardDisplay, matching may be performed between the first node and the second node in a passkey entry (PE) mode.

In still another possible implementation of the first aspect, before the second node sends the pairing response message to the first node, the method further includes:

The second node determines the pairing response message based on the pairing request message and preset pairing mode priority information. The pairing mode priority information indicates that when the first node and the second node share a PSK, pairing performed by using the PSK shared by the first node and the second node has a highest priority in a plurality of pairing modes.

In still another possible implementation of the first aspect, that the second node authenticates the first node based on the first PSK includes:

The second node receives a first authentication parameter from the first node.

The second node verifies the first authentication parameter based on the first PSK.

The foregoing implementation describes a manner in which the second node authenticates the first node, and the first authentication parameter is generated by the first node based on the first PSK. Because the second node also has the first PSK, the second node may verify the first authentication parameter based on the first PSK in a corresponding manner, to determine whether the first PSK on the first node is consistent with the first PSK on the second node. If the first PSK on the first node is consistent with the first PSK on the second node, it indicates that an identity of the first node is trusted. This avoids successful pairing between the second node and an untrusted node, and improves security in a node pairing process.

In still another possible implementation of the first aspect, the method further includes:

The second node generates a second authentication parameter based on the first PSK.

The second node sends the second authentication parameter to the first node.

It can be learned that the second node may also generate the second authentication parameter based on the first PSK, and the second authentication parameter is used by the first node to authenticate the second node.

In still another possible implementation of the first aspect, that the second node generates a second authentication parameter based on the first PSK includes:

The second node receives a first freshness parameter sent by the first node.

The second node generates the second authentication parameter based on the first freshness parameter, a first public key, a second public key, and the first PSK. The first public key and the second public key are parameters for generating a shared key between the first node and the second node.

In still another possible implementation of the first aspect, before the second node receives the first authentication parameter from the first node, the method further includes:

The second node sends a second freshness parameter to the first node.

That the second node verifies the first authentication parameter based on the first PSK includes:

The second node generates a second check parameter based on the second freshness parameter, the first public key, the second public key, and the first PSK.

The second node determines, based on the second check parameter and the first authentication parameter, that the first authentication parameter is verified successfully.

In still another possible implementation of the first aspect, after the second node authenticates the first node based on the first PSK, the method further includes:

The second node receives a third authentication parameter from the first node.

The second node generates a fourth check parameter based on the PSK capability value of the first node.

The second node determines, based on the fourth check parameter and the third authentication parameter, that correctness authentication on the PSK capability value of the first node succeeds.

The method further includes:

The second node generates a fourth authentication parameter based on a PSK capability value of the second node.

The second node sends the fourth authentication parameter to the first node.

It can be learned that, in a case in which a first pairing request message includes the PSK capability value of the first node, the second node may authenticate correctness of the PSK capability value of the first node, to avoid tampering of the PSK capability value of the first node.

According to a second aspect, an embodiment of this application discloses a Bluetooth node pairing method, including:

A first node sends a pairing request message to a second node. The pairing request message includes information used to indicate that the first node has a pre-shared key PSK pairing capability.

The first node receives a pairing response message fed back by the second node. The pairing response message is used to indicate to perform pairing by using a first PSK shared by the first node and the second node.

The first node authenticates the second node based on the first PSK.

It can be learned that a PSK is a secret value shared by the first node and the second node, and the PSK shared with the second node is predefined or configured on the first node. Therefore, the pairing request message may indicate that the first node has the PSK pairing capability. Correspondingly, a PSK (referred to as the first PSK for ease of description) shared with the first node is also predefined or preconfigured on the second node. The first node may authenticate the second node based on the first PSK, to determine that an identity of the second node is trusted, so that subsequent pairing can be successful. In this way, an identity of a node for which a PSK is preconfigured or defined is usually trusted. This avoids successful pairing between the first node and an untrusted node, and improves security in a node pairing process.

In a possible implementation of the second aspect, the first node is a NoInputNoOutput Bluetooth node, a DisplayOnly Bluetooth node, or a DisplayYesNo Bluetooth node.

An existing NoInputNoOutput Bluetooth node can be paired with the second node only in a just work mode. The DisplayOnly Bluetooth node or the DisplayYesNo Bluetooth node does not have an input/output capability. Therefore, if the second node does not have an input/output capability, the second node is also connected in the just work mode. Because the just work mode has low security, in such pairing, an attacker can easily attack the second node by using the first node. Therefore, for the foregoing three types of nodes, pairing may be performed by using a PSK, to improve security of node pairing. Certainly, for a node having an input/output capability, pairing may be performed by entering a passkey, or pairing may be performed by using a PSK.

In another possible implementation of the second aspect, before the first node sends the pairing request message to the second node, the method further includes:

The first node determines that the second node shares the first PSK with the first node.

In still another possible implementation of the second aspect, that the first node determines that the second node shares the first PSK with the first node includes:

The first node obtains a second device identifier of the second node.

The first node determines that the first PSK corresponding to the second device identifier exists.

In still another possible implementation of the second aspect, the pairing request message includes an input/output capability IOC field, and the IOC field includes information used to indicate whether the first node has a PSK pairing capability.

The foregoing describes a data form of the pairing request message. It can be learned that a value in the IOC field may represent the information about whether the first node has a PSK pairing capability, or whether the first PSK shared with the second node exists on the first node. For example, when the IOC field is 0x05, it may indicate that the first node has the PSK pairing capability.

In still another possible implementation of the second aspect, one part of bits in the IOC field include a PSK capability value of the first node, and the PSK capability value of the first node is used to indicate whether the first node has the PSK pairing capability.

Another part of bits in the IOC field are used to indicate an input/output capability of the first node.

The foregoing describes another data form of the pairing request message. It can be learned that one part of bits in the IOC field include the PSK capability value of the first node. For example, the IOC field may include eight bits. Two bits include the PSK capability value of the first node, and the PSK capability value is used to indicate whether the first node has the PSK pairing capability. For example, "01" indicates that the first node has the PSK pairing capability or that the first PSK shared with the second node exists. Therefore, PSK-based pairing may be supported. For another example, "00" indicates that the first node does not have the PSK pairing capability or that the first PSK shared with the second node does not exist. In this case, PSK-based pairing is not supported, and pairing needs to be performed in another mode.

Further, another part of bits in the IOC field are used to indicate the input/output capability of the first node, so that the second node can determine a pairing mode based on the input/output capability of the first node. For example, a value of six bits in the IOC field is 0x01, indicating that the input/output capability of the first node is DisplayOnly. If the input/output capability of the second node is Keyboard-Display, matching may be performed between the first node and the second node in a passkey entry (PE) mode.

In still another possible implementation of the second aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

The foregoing describes still another data form of the pairing request message. It can be learned that the PSK capability field is used to indicate the PSK capability value of the first node. For example, 0x01 indicates that the first node has the PSK pairing capability or that the first PSK shared with the second node exists. Therefore, PSK-based pairing may be supported. For another example, 0x00 indicates that the first node does not have the PSK pairing capability, or the first PSK shared with the second node does not exist. In this case, PSK-based pairing is not supported, and pairing needs to be performed in another mode.

Further, the IOC field is used to indicate the input/output capability of the first node, so that the second node can determine a pairing mode based on the input/output capability of the first node. For example, a value of the IOC field is 0x01, indicating that the input/output capability of the first node is DisplayOnly. If the input/output capability of the second node is KeyboardDisplay, matching may be performed between the first node and the second node in a passkey entry (PE) mode.

In still another possible implementation of the second aspect, that the first node authenticates the second node based on the first PSK includes:

The first node receives a second authentication parameter from the second node.

The first node verifies the second authentication parameter based on the first PSK.

The foregoing implementation describes a manner in which the first node authenticates the second node, and the second authentication parameter is generated by the second node based on the first PSK. Because the first node also has the first PSK, the first node may verify the second authentication parameter based on the first PSK in a corresponding manner, to determine whether the first PSK on the first node is consistent with the first PSK on the second node. If the first PSK on the first node is consistent with the first PSK on the second node, it indicates that an identity of the second node is trusted. This avoids successful pairing between the first node and an untrusted node, and improves security in a node pairing process.

In still another possible implementation of the second aspect, the method further includes:

The first node generates a first authentication parameter based on the first PSK.

The first node sends the first authentication parameter to the second node.

It can be learned that the first node may also generate the first authentication parameter based on the first PSK, and the first authentication parameter is used by the second node to authenticate the first node.

In still another possible implementation of the second aspect, that the first node generates a first authentication parameter based on the first PSK includes:

The first node receives a second freshness parameter sent by the second node.

The first node generates the first authentication parameter based on the second freshness parameter, a first public key, a second public key, and the first PSK. The first public key and the second public key are parameters for generating a shared key between the first node and the second node.

In still another possible implementation of the second aspect, before the first node receives the second authentication parameter from the second node, the method further includes:

The first node sends a first freshness parameter to the second node.

That the first node verifies the second authentication parameter based on the first PSK includes:

The first node generates a first check parameter based on the first freshness parameter, the first public key, the second public key, and the first PSK.

The first node determines, based on the first check parameter and the second authentication parameter, that the second authentication parameter is verified successfully.

In still another possible implementation of the second aspect, after the second node authenticates the first node based on the first PSK, the method further includes:

The second node receives a third authentication parameter from the first node.

The second node generates a fourth check parameter based on the PSK capability value of the first node.

The second node determines, based on the fourth check parameter and the third authentication parameter, that correctness authentication on the PSK capability value of the first node succeeds.

The method further includes:

The second node generates a fourth authentication parameter based on a PSK capability value of the second node.

The second node sends the fourth authentication parameter to the first node.

It can be learned that, the first node may authenticate correctness of the PSK capability value of the second node, to avoid tampering of the PSK capability value of the second node.

According to a third aspect, an embodiment of this application discloses a Bluetooth pairing apparatus, including:

a receiving unit, configured to receive a pairing request message from a first node, where the pairing request message includes information used to indicate whether the first node has a pre-shared key PSK pairing capability;

a sending unit, configured to send a pairing response message to the first node in response to the fact that the pairing request message includes information used to indicate that the first node has the PSK pairing capability, where the pairing response message is used to indicate to perform pairing by using a first PSK shared by the first node and a second node; and a processing unit, configured to authenticate the first node based on the first PSK.

It can be learned that a PSK is a secret value shared by the first node and the second node, and the PSK shared with second node is predefined or configured on the first node. Therefore, the apparatus may include, in the pairing request message, the information indicating that the first node has the PSK pairing capability. Correspondingly, the first PSK shared with the first node is also predefined or preconfigured on the second node. The apparatus may authenticate the first node based on the first PSK, to determine that an identity of the first node is trusted, so that subsequent pairing can be successful. In this way, an identity of a node for which a PSK is preconfigured or defined is usually trusted. This avoids successful pairing between the apparatus and an untrusted node, and improves security in a node pairing process.

In a possible implementation of the third aspect, the processing unit is further configured to:

determine that the second node shares the first PSK with the first node.

In another possible implementation of the third aspect, the processing unit is specifically configured to:

obtain a first device identifier of the first node; and determine that the first PSK corresponding to the first device identifier exists.

In still another possible implementation of the third aspect, the pairing request message includes an input/output capability IOC field, and the IOC field includes the information used to indicate whether the first node has a PSK pairing capability.

In still another possible implementation of the third aspect, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate an input/output capability of the first node.

In still another possible implementation of the third aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation of the third aspect, the processing unit is further configured to determine the pairing response message based on the pairing request message and preset pairing mode priority information. The pairing mode priority information indicates that when the first node and the second node share a PSK, pairing performed by using the PSK shared by the first node and the second node has a highest priority in a plurality of pairing modes.

In still another possible implementation of the third aspect, the receiving unit is further configured to receive a first authentication parameter from the first node.

The processing unit is further configured to verify the first authentication parameter based on the first PSK.

In still another possible implementation of the third aspect, the processing unit is further configured to generate a second authentication parameter based on the first PSK.

The sending unit is further configured to send the second authentication parameter to the first node.

In still another possible implementation of the third aspect, the receiving unit is further configured to receive a third authentication parameter from the first node.

The processing unit is further configured to generate a fourth check parameter based on the PSK capability value of the first node.

The processing unit is further configured to determine, based on the fourth check parameter and the third authentication parameter, that correctness authentication on the PSK capability value of the first node succeeds.

The processing unit is further configured to generate a fourth authentication parameter based on a PSK capability value of the second node.

The sending unit is further configured to send the fourth authentication parameter to the first node.

According to a fourth aspect, an embodiment of this application discloses a Bluetooth pairing apparatus, including:

a sending unit, configured to send a pairing request message to a second node, where the pairing request message includes information used to indicate that a first node has a pre-shared key PSK pairing capability;

a receiving unit, configured to receive a pairing response message fed back by the second node, where the pairing response message is used to indicate to perform pairing by using a first PSK shared by the first node and the second node; and a processing unit, configured to authenticate the second node based on the first PSK.

It can be learned that a PSK is a secret value shared by the first node and the second node, and the PSK shared with the second node is predefined or configured on the first node. Therefore, the second node may indicate, in the pairing request message, that the first node has the PSK pairing capability. Correspondingly, a PSK (referred to as the first PSK for ease of description) shared with the first node is also predefined or preconfigured on the second node. The apparatus may authenticate the second node based on the first PSK, to determine that an identity of the second node is trusted, so that subsequent pairing can be successful. In this way, an identity of a node for which a PSK is preconfigured or defined is usually trusted. This avoids successful pairing between the apparatus and an untrusted node, and improves security in a node pairing process.

In a possible implementation of the fourth aspect, the processing unit is further configured to determine that the second node shares the first PSK with the first node.

In another possible implementation of the fourth aspect, the processing unit is specifically configured to:

obtain a second device identifier of the second node; and determine that the first PSK corresponding to the second device identifier exists.

In still another possible implementation of the fourth aspect, the pairing request message includes an input/output capability IOC field, and the IOC field includes information used to indicate whether the first node has a PSK pairing capability.

In still another possible implementation of the fourth aspect, one part of bits in the IOC field include a PSK capability value of the first node, and the PSK capability value of the first node is used to indicate whether the first node has the PSK pairing capability.

Another part of bits in the IOC field are used to indicate an output capability of the first node.

In still another possible implementation of the fourth aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation of the fourth aspect, the receiving unit is further configured to receive a second authentication parameter from the second node.

The processing unit is further configured to verify the second authentication parameter based on the first PSK.

In still another possible implementation of the fourth aspect, the processing unit is further configured to generate a first authentication parameter based on the first PSK.

The sending unit is further configured to send the first authentication parameter to the second node.

In still another possible implementation of the fourth aspect, the pairing response message includes a PSK capability value of the second node, and the PSK capability value of the second node is used to indicate that the second node has the PSK pairing capability.

The receiving unit is further configured to receive a fourth authentication parameter from the second node.

The processing unit is further configured to generate a third check parameter based on the PSK capability value of the second node.

The processing unit is further configured to determine, based on the third check parameter and the fourth authentication parameter, that correctness authentication on the PSK capability value of the first node succeeds.

The processing unit is further configured to generate a third authentication parameter based on the PSK capability value of the first node.

The sending unit is further configured to send the third authentication parameter to the second node.

According to a fifth aspect, an embodiment of this application discloses a Bluetooth node pairing method, including:

A second node receives a pairing request message from a first node. The pairing request message includes information used to indicate a pairing capability of the first node. The pairing capability of the first node includes whether the first node has a pre-shared key PSK pairing capability and an input/output capability of the first node.

The second node determines a pairing mode based on the information about the pairing capability of the first node and information about a pairing capability of the second node. The pairing capability of the second node includes whether the second node has the PSK pairing capability and an input/output capability of the second node. The pairing mode includes PSK-based pairing, numeric comparison NC, just work JW, or passkey entry PE.

The second node sends a pairing response message to the first node. The pairing response message includes the information used to indicate the pairing capability of the second node.

The second node performs pairing with the first node based on the pairing mode.

It can be learned that the pairing request message includes the information about the pairing capability of the first node, and the second node may determine a corresponding pairing mode based on a requirement and based on whether the first node has the PSK pairing capability and the input/output capability of the first node. For example, the second node may determine, by using a method such as preferentially selecting PSK-based pairing or selecting a pairing mode based on a priority of each mode, a pairing mode that meets a requirement of the second node.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation of the fifth aspect, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate the input/output capability of the first node.

The foregoing describes a data form of the pairing request message. It can be learned that one part of bits in the IOC field include the PSK capability value of the first node. For example, the IOC field may include eight bits. Two bits include the PSK capability value of the first node, and the PSK capability value is used to indicate whether the first node has the PSK pairing capability. For example, "01" indicates that the first node has the PSK pairing capability or that a first PSK shared with the second node exists. Therefore, PSK-based pairing may be supported. For another example, "00" indicates that the first node does not have the PSK pairing capability or that a first PSK shared with the second node does not exist. In this case, PSK-based pairing is not supported, and pairing needs to be performed in another mode.

Further, another part of bits in the IOC field are used to indicate the input/output capability of the first node, so that the second node can determine a pairing mode based on the input/output capability of the first node. For example, a value of six bits in the IOC field is 0x01, indicating that the input/output capability of the first node is DisplayOnly. If the input/output capability of the second node is Keyboard-Display, matching may be performed between the first node and the second node in a passkey entry (PE) mode.

In another possible implementation of the fifth aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

The foregoing describes another data form of the pairing request message. It can be learned that the PSK capability field is used to indicate the PSK capability value of the first node. For example, 0x01 indicates that the first node has the PSK pairing capability or that the first PSK shared with the second node exists. Therefore, PSK-based pairing may be supported. For another example, 0x00 indicates that the first node does not have the PSK pairing capability, or the first PSK shared with the second node does not exist. In this case, PSK-based pairing is not supported, and pairing needs to be performed in another mode.

Further, the IOC field is used to indicate the input/output capability of the first node, so that the second node can determine a pairing mode based on the input/output capability of the first node. For example, a value of the IOC field is 0x01, indicating that the input/output capability of the first node is DisplayOnly. If the input/output capability of the second node is KeyboardDisplay, matching may be performed between the first node and the second node in a passkey entry (PE) mode.

In still another possible implementation of the fifth aspect, that the second node determines a pairing mode based on the information about the pairing capability of the first node and information about a pairing capability of the second node includes:

The second node determines, based on the information about the pairing capability of the first node, that the first node has the PSK pairing capability.

The second node determines that the second node shares the first PSK with the first node.

The second node performs pairing by using the first PSK shared by the first node and the second node.

In still another possible implementation of the fifth aspect, that the second node determines that the second node shares the first PSK with the first node includes:

The second node obtains a first device identifier of the first node.

The second node determines that the first PSK corresponding to the first device identifier exists.

In still another possible implementation of the fifth aspect, that the second node determines a pairing mode based on the information about the pairing capability of the first node and information about a pairing capability of the second node includes:

The second node determines, based on the information about the pairing capability of the first node, that the first node has the PSK pairing capability.

The second node determines that the second node shares the first PSK with the first node.

The second node determines a first pairing mode based on the input/output capability of the first node and the input/output capability of the second node. The first pairing mode is numeric comparison NC, just work JW, or passkey entry PE.

The second node determines a pairing mode based on a priority of the first pairing mode and a priority of PSK-based pairing.

In still another possible implementation of the fifth aspect, that the second node determines a pairing mode based on the information about the pairing capability of the first node and information about a pairing capability of the second node includes:

The second node determines, based on the information about the pairing capability of the first node, that the first node has the PSK pairing capability.

The second node determines that the second node shares the first PSK with the first node.

The second node determines a first pairing mode based on the input/output capability of the first node and the input/output capability of the second node. The first pairing mode is numeric comparison NC, just work JW, or passkey entry PE.

The second node determines a pairing mode based on a priority of the first pairing mode and a priority of PSK-based pairing.

In still another possible implementation of the fifth aspect, that the second node performs pairing by using the first PSK shared by the first node and the second node includes:

The second node receives a first authentication parameter from the first node.

The second node verifies the first authentication parameter based on the first PSK.

In still another possible implementation of the fifth aspect, the method further includes:

The second node generates a second authentication parameter based on the first PSK.

The second node sends the second authentication parameter to the first node.

In still another possible implementation of the fifth aspect, that the second node generates a second authentication parameter based on the first PSK includes:

The second node receives a first freshness parameter sent by the first node.

The second node generates the second authentication parameter based on the first freshness parameter, a first public key, a second public key, and the first PSK. The first public key and the second public key are parameters for generating a shared key between the first node and the second node.

In still another possible implementation of the fifth aspect, before the second node receives the first authentication parameter from the first node, the method further includes:

The second node sends a second freshness parameter to the first node.

That the second node verifies the first authentication parameter based on the first PSK includes:

The second node generates a second check parameter based on the second freshness parameter, the first public key, the second public key, and the first PSK.

The second node determines, based on the second check parameter and the first authentication parameter, that the first authentication parameter is verified successfully.

In still another possible implementation of the fifth aspect, after the second node authenticates the first node based on the first PSK, the method further includes:

The second node receives a third authentication parameter from the first node.

The second node generates a fourth check parameter based on the PSK capability value of the first node.

The second node determines, based on the fourth check parameter and the third authentication parameter, that correctness authentication on the PSK capability value of the first node succeeds.

The method further includes:

The second node generates a fourth authentication parameter based on a PSK capability value of the second node.

The second node sends the fourth authentication parameter to the first node.

According to a sixth aspect, an embodiment of this application discloses a Bluetooth node pairing method, including:

A first node sends a pairing request message to a second node. The pairing request message includes information used to indicate a pairing capability of the first node. The pairing capability of the first node includes whether the first node has a pre-shared key PSK pairing capability and an input/output capability of the first node.

The first node receives a pairing response message from the second node. The pairing response message includes information used to indicate a pairing capability of the second node. The pairing capability of the second node includes whether the second node has the PSK pairing capability and an input/output capability of the second node.

The first node determines a pairing mode based on the information about the pairing capability of the first node and the information about the pairing capability of the second node. The pairing mode includes PSK-based pairing, numeric comparison NC, just work JW, or passkey entry PE.

The first node performs pairing with the second node based on the pairing mode.

It can be learned that the pairing request message includes the information about the pairing capability of the first node, and the pairing response message includes the information about the pairing capability of the second node. The first node may determine a corresponding pairing mode based on a requirement and based on the information about the pairing capability of the first node and the information about the pairing capability of the second node. For example, the first node may determine, by using a method such as preferentially selecting PSK-based pairing or selecting a pairing mode based on a priority of each mode, a pairing mode that meets a requirement.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation of the sixth aspect, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate the input/output capability of the first node.

The foregoing describes a data form of the pairing request message. It can be learned that one part of bits in the IOC field include the PSK capability value of the first node. For example, the IOC field may include eight bits. Two bits include the PSK capability value of the first node, and the PSK capability value is used to indicate whether the first node has the PSK pairing capability. For example, "01" indicates that the first node has the PSK pairing capability or that a first PSK shared with the second node exists. Therefore, PSK-based pairing may be supported. For another example, "00" indicates that the first node does not have the PSK pairing capability or that a first PSK shared with the second node does not exist. In this case, PSK-based pairing is not supported, and pairing needs to be performed in another mode.

Further, another part of bits in the IOC field are used to indicate the input/output capability of the first node, so that the second node can determine a pairing mode based on the input/output capability of the first node. For example, a value of six bits in the IOC field is 0x01, indicating that the input/output capability of the first node is DisplayOnly. If the input/output capability of the second node is Keyboard-Display, matching may be performed between the first node and the second node in a passkey entry (PE) mode.

In another possible implementation of the sixth aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate the input/output capability of the first node.

The foregoing describes still another data form of the pairing request message. It can be learned that the PSK capability field is used to indicate the PSK capability value of the first node. For example, 0x01 indicates that the first node has the PSK pairing capability or that the first PSK shared with the second node exists. Therefore, PSK-based pairing may be supported. For another example, 0x00 indicates that the first node does not have the PSK pairing capability, or the first PSK shared with the second node does not exist. In this case, PSK-based pairing is not supported, and pairing needs to be performed in another mode.

Further, the IOC field is used to indicate the input/output capability of the first node, so that the second node can determine a pairing mode based on the input/output capability of the first node. For example, a value of the IOC field is 0x01, indicating that the input/output capability of the first node is DisplayOnly. If the input/output capability of the second node is KeyboardDisplay, matching may be performed between the first node and the second node in a passkey entry (PE) mode.

In still another possible implementation of the sixth aspect, before the first node sends the pairing request message to the second node, the method includes:

The first node determines that the second node shares the first PSK with the first node.

That the first node determines a pairing mode based on the information about the pairing capability of the first node and the information about the pairing capability of the second node includes:

The first node determines, based on the information about the pairing capability of the second node, that the first node has the PSK pairing capability.

The first node performs pairing by using the first PSK shared by the first node and the second node.

In still another possible implementation of the sixth aspect, that the first node determines that the second node shares the first PSK with the first node includes:

The first node obtains a second device identifier of the second node.

The first node determines that the first PSK corresponding to the second device identifier exists.

In still another possible implementation of the sixth aspect, that the second node determines a pairing mode based on the information about the pairing capability of the first node and the information about the pairing capability of the second node includes:

The first node determines, based on the information about the pairing capability of the second node, that the second node does not have the PSK pairing capability.

The first node determines the pairing mode based on the input/output capability of the first node and the input/output capability of the second node. The pairing mode is numeric comparison NC, just work JW, or passkey entry PE.

In still another possible implementation of the sixth aspect, that the second node determines a pairing mode based on the information about the pairing capability of the first node and the information about the pairing capability of the second node includes:

The first node determines, based on the information about the pairing capability of the second node, that the first node has the PSK pairing capability.

The first node determines that the second node shares the first PSK with the first node.

The first node determines a first pairing mode based on the input/output capability of the first node and the input/output capability of the second node. The first pairing mode is numeric comparison NC, just work JW, or passkey entry PE.

The first node determines a pairing mode based on a priority of the first pairing mode and a priority of PSK-based pairing.

In still another possible implementation of the sixth aspect, that the first node performs pairing by using the first PSK shared by the first node and the second node includes:

The first node receives a second authentication parameter from the second node.

The first node verifies the second authentication parameter based on the first PSK.

In still another possible implementation of the sixth aspect, the method further includes:

The first node generates a first authentication parameter based on the first PSK.

The first node sends the first authentication parameter to the second node.

In still another possible implementation of the sixth aspect, that the first node generates a first authentication parameter based on the first PSK includes:

The first node receives a second freshness parameter sent by the second node.

The first node generates the first authentication parameter based on the second freshness parameter, a first public key, a second public key, and the first PSK. The first public key and the second public key are parameters for generating a shared key between the first node and the second node.

In still another possible implementation of the sixth aspect, before the first node receives the second authentication parameter from the second node, the method further includes:

The first node sends a first freshness parameter to the second node.

That the first node verifies the second authentication parameter based on the first PSK includes:

The first node generates a first check parameter based on the first freshness parameter, the first public key, the second public key, and the first PSK.

The first node determines, based on the first check parameter and the second authentication parameter, that the second authentication parameter is verified successfully.

In still another possible implementation of the sixth aspect, after the second node authenticates the first node based on the first PSK, the method further includes:

The second node receives a third authentication parameter from the first node.

The second node generates a fourth check parameter based on the PSK capability value of the first node.

The second node determines, based on the fourth check parameter and the third authentication parameter, that correctness authentication on the PSK capability value of the first node succeeds.

The method further includes:

The second node generates a fourth authentication parameter based on a PSK capability value of the second node.

The second node sends the fourth authentication parameter to the first node.

According to a seventh aspect, an embodiment of this application discloses a Bluetooth pairing apparatus, including:

a receiving unit, configured to receive a pairing request message from a first node, where the pairing request message includes information used to indicate a pairing capability of the first node, and the pairing capability of the first node includes whether the first node has a pre-shared key PSK pairing capability and an input/output capability of the first node;

a processing unit, configured to determine a pairing mode based on the information about the pairing capability of the first node and information about a pairing capability of a second node, where the pairing capability of the second node includes whether the second node has the PSK pairing capability and an input/output capability of the second node, and the pairing mode includes PSK-based pairing, numeric comparison NC, just work JW, or passkey entry PE; and a sending unit, configured to send a pairing response message to the first node, where the pairing response message includes the information used to indicate the pairing capability of the second node.

The processing unit is further configured to perform pairing with the first node based on the pairing mode.

It can be learned that the pairing request message includes the information about the pairing capability of the first node, and the apparatus may determine a corresponding pairing mode based on a requirement and based on whether the first node has the PSK pairing capability and the input/output capability of the first node. For example, the apparatus may determine, by using a method such as preferentially selecting PSK-based pairing or selecting a pairing mode based on a priority of each mode, a pairing mode that meets a requirement of the second node.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation of the seventh aspect, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate the input/output capability of the first node.

In another possible implementation of the seventh aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation of the seventh aspect, the processing unit is specifically configured to:
determine, based on the information about the pairing capability of the first node, that the first node has the PSK pairing capability;
determine that the second node shares a first PSK with the first node; and
perform pairing by using the first PSK shared by the first node and the second node.

In still another possible implementation of the seventh aspect, the processing unit is specifically configured to:
obtain a first device identifier of the first node; and
determine that the first PSK corresponding to the first device identifier exists.

In still another possible implementation of the seventh aspect, the processing unit is specifically configured to:
determine, based on the information about the pairing capability of the first node, that the first node has the PSK pairing capability;
determine that the second node shares the first PSK with the first node;
determine a first pairing mode based on the input/output capability of the first node and the input/output capability of the second node, where the first pairing mode is numeric comparison NC, just work JW, or passkey entry PE; and
determine a pairing mode based on a priority of the first pairing mode and a priority of PSK-based pairing.

In still another possible implementation of the seventh aspect, the processing unit is specifically configured to:
determine, based on the information about the pairing capability of the first node, that the first node has the PSK pairing capability;
determine that the second node shares the first PSK with the first node;
determine a first pairing mode based on the input/output capability of the first node and the input/output capability of the second node, where the first pairing mode is numeric comparison NC, just work JW, or passkey entry PE; and
determine a pairing mode based on a priority of the first pairing mode and a priority of PSK-based pairing.

In still another possible implementation of the seventh aspect, the receiving unit is further configured to receive a first authentication parameter from the first node.

The processing unit is further configured to verify the first authentication parameter based on the first PSK.

In still another possible implementation of the seventh aspect, the processing unit is further configured to generate a second authentication parameter based on the first PSK.

The sending unit is further configured to send the second authentication parameter to the first node.

In still another possible implementation of the seventh aspect, the receiving unit is further configured to receive a first freshness parameter sent by the first node.

The processing unit is further configured to generate the second authentication parameter based on the first freshness parameter, a first public key, a second public key, and the first PSK. The first public key and the second public key are parameters for generating a shared key between the first node and the second node.

In still another possible implementation of the seventh aspect, the sending unit is further configured to send a second freshness parameter to the first node.

The processing unit is further configured to generate a second check parameter based on the second freshness parameter, the first public key, the second public key, and the first PSK.

The processing unit is further configured to determine, based on the second check parameter and the first authentication parameter, that the first authentication parameter is verified successfully.

In still another possible implementation of the seventh aspect, the receiving unit is further configured to receive a third authentication parameter from the first node.

The processing unit is further configured to generate a fourth check parameter based on the PSK capability value of the first node.

The processing unit is further configured to determine, based on the fourth check parameter and the third authentication parameter, that correctness authentication on the PSK capability value of the first node succeeds.

The processing unit is further configured to generate a fourth authentication parameter based on a PSK capability value of the second node.

The sending unit is further configured to send the fourth authentication parameter to the first node.

According to an eighth aspect, an embodiment of this application discloses a Bluetooth node pairing apparatus, including:
- a sending unit, configured to send a pairing request message to a second node, where the pairing request message includes information used to indicate a pairing capability of a first node, and the pairing capability of the first node includes whether the first node has a pre-shared key PSK pairing capability and an input/output capability of the first node;
- a receiving unit, configured to receive a pairing response message from the second node, where the pairing response message includes information used to indicate a pairing capability of the second node, and the pairing capability of the second node includes whether the second node has the PSK pairing capability and an input/output capability of the second node; and
- a processing unit, configured to determine a pairing mode based on the information about the pairing capability of the first node and the information about the pairing capability of the second node, where the pairing mode includes PSK-based pairing, numeric comparison NC, just work JW, or passkey entry PE.

The processing unit is further configured to perform pairing with the second node based on the pairing mode.

It can be learned that the pairing request message includes the information about the pairing capability of the first node, and the pairing response message includes the information about the pairing capability of the second node. The apparatus may determine a corresponding pairing mode based on a requirement and based on the information about the pairing capability of the first node and the information about the pairing capability of the second node. For example, the apparatus may determine, by using a method such as preferentially selecting PSK-based pairing or selecting a pairing mode based on a priority of each mode, a pairing mode that meets a requirement.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation of the eighth aspect, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate the input/output capability of the first node.

In another possible implementation of the eighth aspect, the pairing request message includes a PSK capability field, the PSK capability field includes a PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation of the eighth aspect, the processing unit is further configured to:
- determine that the second node shares a first PSK with the first node;
- determine, based on the information about the pairing capability of the second node, that the first node has the PSK pairing capability; and
- perform pairing by using the first PSK shared by the first node and the second node.

In still another possible implementation of the eighth aspect, the processing unit is further configured to: obtain a second device identifier of the second node; and
- determine that the first PSK corresponding to the second device identifier exists.

In still another possible implementation of the eighth aspect, the processing unit is specifically configured to:
- determine, based on the information about the pairing capability of the second node, that the second node does not have the PSK pairing capability; and
- determine the pairing mode based on the input/output capability of the first node and the input/output capability of the second node, where the pairing mode is numeric comparison NC, just work JW, or passkey entry PE.

In still another possible implementation of the eighth aspect, the processing unit is specifically configured to:
- determine, based on the information about the pairing capability of the second node, that the first node has the PSK pairing capability;
- determine that the second node shares the first PSK with the first node;
- determine a first pairing mode based on the input/output capability of the first node and the input/output capability of the second node, where the first pairing mode is numeric comparison NC, just work JW, or passkey entry PE; and
- determine a pairing mode based on a priority of the first pairing mode and a priority of PSK-based pairing.

In still another possible implementation of the eighth aspect, the receiving unit is further configured to receive a second authentication parameter from the second node.

The processing unit is further configured to verify the second authentication parameter based on the first PSK.

In still another possible implementation of the eighth aspect, the processing unit is further configured to generate a first authentication parameter based on the first PSK.

The sending unit is further configured to send the first authentication parameter to the second node.

In still another possible implementation of the eighth aspect, the receiving unit is further configured to receive a second freshness parameter sent by the second node.

The processing unit is further configured to generate the first authentication parameter based on the second freshness parameter, a first public key, a second public key, and the first PSK. The first public key and the second public key are parameters for generating a shared key between the first node and the second node.

In still another possible implementation of the eighth aspect, the sending unit is further configured to send a first freshness parameter to the second node.

The processing unit is further configured to generate a first check parameter based on the first freshness parameter, the first public key, the second public key, and the first PSK.

The processing unit is further configured to determine, based on the first check parameter and the second authentication parameter, that the second authentication parameter is verified successfully.

In still another possible implementation of the eighth aspect, the receiving unit is further configured to receive a third authentication parameter from the first node.

The processing unit is further configured to generate a fourth check parameter based on the PSK capability value of the first node.

The processing unit is further configured to determine, based on the fourth check parameter and the third authentication parameter, that correctness authentication on the PSK capability value of the first node succeeds.

The processing unit is further configured to generate a fourth authentication parameter based on a PSK capability value of the second node.

The sending unit is further configured to send the fourth authentication parameter to the first node.

According to a ninth aspect, an embodiment of this application further provides a Bluetooth pairing apparatus. The Bluetooth pairing apparatus includes at least one processor and a communication interface. The communication interface is configured to send and/or receive data. The at least one processor is configured to invoke a computer program stored in at least one memory, so that the apparatus implements the method described in any one of the first aspect or the possible implementations of the first aspect, any one of the second aspect or the possible implementations of the second aspect, any one of the fifth aspect or the possible implementations of the fifth aspect, or any one of the sixth aspect or the possible implementations of the sixth aspect.

According to a tenth aspect, an embodiment of this application further provides a communication system. The communication system includes a first node and a second node. The first node is the apparatus described in any one of the third aspect or the possible implementations of the third aspect, or any one of the seventh aspect or the possible implementations of the seventh aspect. The second node is the apparatus described in any one of the fourth aspect or the possible implementations of the fourth aspect, or any one of the eighth aspect or the possible implementations of the eighth aspect.

According to an eleventh aspect, an embodiment of this application discloses a computer-readable storage medium. The computer-readable storage medium stores a computer program, and when the computer program is run on one or more processors, the method described in any one of the first aspect or the possible implementations of the first aspect, any one of the second aspect or the possible implementations of the second aspect, any one of the fifth aspect or the possible implementations of the fifth aspect, or any one of the sixth aspect or the possible implementations of the sixth aspect is performed.

According to a twelfth aspect, an embodiment of this application discloses a computer program product. When the computer program product runs on one or more processors, the method described in any one of the first aspect or the possible implementations of the first aspect, any one of the second aspect or the possible implementations of the second aspect, any one of the fifth aspect or the possible implementations of the fifth aspect, or any one of the sixth aspect or the possible implementations of the sixth aspect is performed.

According to a thirteenth aspect, an embodiment of this application discloses a chip system. The chip system includes at least one processor, a memory, and an interface circuit. The interface circuit is configured to provide an information input/output for the at least one processor. The memory stores a computer program, and when the computer program is run on one or more processors, the method described in any one of the first aspect or the possible implementations of the first aspect is performed, or the method described in any one of the fifth aspect or the possible implementations of the fifth aspect is performed.

According to a fourteenth aspect, an embodiment of this application discloses a chip system. The chip system includes at least one processor, a memory, and an interface circuit. The interface circuit is configured to provide an information input/output for the at least one processor. The memory stores a computer program, and when the computer program is run on one or more processors, the method described in any one of the second aspect or the possible implementations of the second aspect is performed, or the method described in any one of the sixth aspect or the possible implementations of the sixth aspect is performed.

According to a fifteenth aspect, an embodiment of this application discloses a vehicle. The vehicle includes a first node (for example, an automobile cockpit domain controller CDC). The first node is the apparatus described in any one of the third aspect or the possible implementations of the third aspect, or any one of the seventh aspect or the possible implementations of the seventh aspect.

Further, the vehicle includes a second node (for example, at least one of modules such as a camera, a screen, a microphone, a speaker, radar, an electronic key, and a passive entry passive start system controller). The second node is the apparatus described in any one of the fourth aspect or the possible implementations of the fourth aspect or any one of the eighth aspect or the possible implementations of the eighth aspect.

BRIEF DESCRIPTION OF DRAWINGS

The following describes the accompanying drawings used in embodiments of this application.

FIG. 6 is a schematic diagram of a method for determining a pairing mode according to an embodiment of this application;

DESCRIPTION OF EMBODIMENTS

Figure 1:
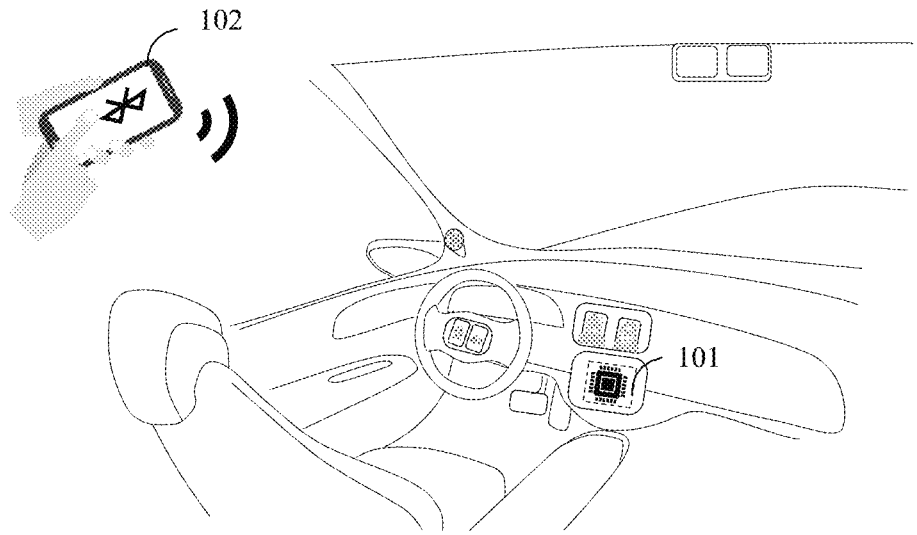
FIG. 1 is a schematic diagram of an application scenario according to an embodiment of this application.

The following describes embodiments of this application with reference to the accompanying drawings in embodiments of this application. It should be noted that in this application, the word such as "example" or "for example" is used to represent giving an example, an illustration, or descriptions. Any embodiment or design scheme described using "example" or "for example" in this application should not be explained as being more preferred or having more advantages than another embodiment or design scheme. Use of the word such as "example" or "for example" is intended to present a related concept in a specific manner.

The following first briefly describes related technologies and technical terms in this application for ease of understanding.

1. Node

The node is an electronic device that has a data receiving and sending capability. For example, the node may be a cockpit domain device, or a module (for example, one or more of modules such as a cockpit domain controller (CDC), a camera, a screen, a microphone, a speaker, an electronic key, and a passive entry passive start system controller) in the cockpit domain device. During specific implementation, the node may alternatively be a data transfer device, for example, a router, a repeater, a bridge, or a switch; or may be a terminal device, for example, various types of user equipment (UE), a mobile phone, a tablet computer (pad), a desktop computer, a headset, or a speaker; or may further include a machine intelligence device such as a self-driving device, a transportation safety device, a virtual reality (VR) terminal device, an augmented reality (AR) terminal device, a machine type communication (MTC) device, an industrial control device, a remote medical device, a smart grid device, or a smart city device, or may further include a wearable device (for example, a smart watch, a smart band, or a pedometer), or the like. In some technical scenarios, a name of a device with a similar data receiving and sending capability may not be node. However, for ease of description, electronic devices that have a data receiving and sending capability are collectively referred to as nodes in embodiments of this application.

2. Shared Key (SK)

The shared key is a same secret value stored in nodes of two communication parties, and the shared key may be generated by the two communication parties by using a same key obtaining method. A pre-shared key (PSK) is also a type of shared key.

For example, a cockpit domain controller (CDC) of a vehicle and a mobile phone of a vehicle owner are two nodes that can communicate with each other by using a Bluetooth technology. When the vehicle owner needs to perform pairing with the CDC of the vehicle by using the mobile phone, the vehicle owner may first generate a shared key by exchanging a public key, for example, generate a shared key by exchanging key agreement algorithm parameters between the mobile phone and the CDC of the vehicle by using a key agreement algorithm. The shared key may be used to verify identities of both nodes when the mobile phone subsequently requests pairing with the CDC of the vehicle again.

3. Key Agreement

Key agreement is a process in which two communication parties exchange some parameters to obtain a key through agreement. A cryptographic algorithm used for key agreement is referred to as a key agreement algorithm, and may also be referred to as a key exchange algorithm. Common key agreement algorithms include the Diffie-Hellman (DH) algorithm, the elliptic curve cryptosystem (ECC)-based Diffie-Hellman (ECDH) algorithm, the Oakley algorithm, the SM algorithm (such as SM1, SM2, SM3, and SM4), and the like.

4. Bluetooth Pairing Process

Bluetooth is a short-range wireless communication technology, and can be used for wireless information exchange between nodes. Pairing needs to be performed first between nodes that communicate with each other by using Bluetooth. A pairing process aims to generate a link key between two Bluetooth nodes, and the link key is used to authenticate identities of each other and encrypt exchanged data. In an actual application, generally, two nodes do not directly perform encryption by using a link key, but export a session key by using the link key for encrypting exchanged data. The session key may include one or more of an encryption key, an integrity key, and the like.

Bluetooth pairing methods mainly include personal identification number/legacy pairing (PIN/LP) and secure simple pairing (SSP). When the PIN/legacy pairing method is used, when two Bluetooth nodes enter a same password PIN, the two Bluetooth nodes export a link key. This method requires that both nodes have an input capability, is applicable to few scenarios, and has relatively low security.

5. Input/Output (I/O) Capability

Input/Output functions of a node can be obtained by combining an input function and an output function. The input function may be "No Input", "Yes/No" (which may also be represented as "YesNo"), or "Keyboard", which is described in detail as follows:

(1) "No Input" indicates that the node does not have a capability of inputting "Yes", "No", or other data.

(2) "Yes/No" indicates that the node has at least two buttons, and the two buttons can be mapped to "Yes" and "No"; or that the node has another mechanism that can indicate "Yes" or "No".

(3) "Keyboard" indicates that the node has at least one numeric keyboard on which digits from 0 to 9 or other characters can be entered, and a confirmation. The node has at least two buttons, and the two buttons can be mapped to "Yes" and "No"; or the node has another mechanism that can indicate "Yes" or "No".

The output function may be "No Output" or "Numeric Output", which is described in detail as follows:
(1) "No Output" indicates that the node does not have a capability of displaying or transferring six characters.
(2) "Numeric Output" indicates that the node has the capability of displaying or transferring six characters.

An I/O capability may be obtained by combining the input function and the output function. Table 1 is an I/O capability combination table provided in embodiments of this application. It can be learned that an I/O capability of a node includes NoInputNoOutput, DisplayOnly, DisplayYesNo, KeyboardOnly, and KeyboardDisplay.

TABLE 1

| I/O capability combination table | | |
|---|---|---|
| | No Output | Numeric Output |
| No Input | NoInputNoOutput | DisplayOnly |
| Yes/No | NoInputNoOutput | DisplayYesNo |
| Keyboard | KeyboardOnly | KeyboardDisplay |

6. Key Derivation

Key derivation is to derive one or more secret values from one secret value, and an algorithm used to derive a key is referred to as a key derivation function (KDF), and is also referred to as a key derivation algorithm. For example, a new secret value DK derived from a secret value Key may be represented as follows: DK=KDF (Key).

Common key derivation algorithms include a password-based key derivation function (PBKDF), a scrypt algorithm, and the like. The PBKDF algorithm further includes a first-generation PBKDF1 and a second-generation PBKDF2. Optionally, in a key derivation process of some KDF algorithms, a hash algorithm is used to perform a hash change on an input secret value. Therefore, an algorithm identifier may be further received as an input in the KDF function, to indicate a hash algorithm to be used.

7. Freshness Parameter

The freshness parameter is a parameter commonly used in cryptography, and is usually used to generate a key, an authentication parameter, and the like. The freshness parameter may also be referred to as freshness or a fresh parameter, and may include at least one of a NONCE (number once), a counter, a sequence number, and the like. The NONCE is a random value that is used only once (or non-repeated). Freshness parameters generated at different moments are usually different. In other words, a specific value of a freshness parameter changes each time a freshness parameter is generated. Therefore, a freshness parameter used to generate a key (or an authentication parameter, or the like) this time is different from a freshness parameter used to generate a key (or an authentication parameter, or the like) last time. This can improve security of the generated key.

For example, the freshness parameter may be a random number obtained by a node by using a random number generator.

The following describes a system architecture and a service scenario in embodiments of this application. It should be noted that the system architecture and the service scenario described in this application are intended to describe the technical solutions in this application more clearly, and do not constitute a limitation on the technical solutions provided in this application. A person of ordinary skill in the art may know that with evolution of the system architecture and emergence of new service scenarios, the technical solutions provided in this application are also applicable to similar technical problems.

FIG. 1 is a schematic diagram of an application scenario of a Bluetooth node pairing method according to an embodiment of this application. A cockpit domain controller (CDC) 101 of a vehicle is a control center in an intelligent cockpit device, and may be considered as a first node, and a smartphone 102 may be considered as a second node. The smartphone 102 may send a pairing request message to the CDC 101, to request pairing with the CDC 101. The CDC 101 may select a pairing mode for pairing based on an input/output capability of the smartphone 102 described in the pairing request message. Generally, the smartphone 102 may support input and display, and the CDC 101 may also support input and display. Therefore, pairing may be performed by using a numeric comparison or passkey entry mode. However, if an attacker enters the vehicle at this time and connects to the CDC 101 by using a mobile phone of the attacker, because the numeric comparison mode cannot prevent the attacker from connecting to the CDC 101, the CDC 101 is successfully connected to the mobile phone of the attacker, and vehicle security is threatened.

For another example, if the CDC 101 is connected to a Bluetooth headset, because the Bluetooth headset cannot input or display content, the Bluetooth headset can be connected only in a just work mode. In addition, if the attacker requests to connect to the Bluetooth headset, the Bluetooth headset is also successfully paired with a device of the attacker. As a result, security of the Bluetooth headset is threatened. Therefore, an existing pairing method cannot meet a security requirement of a node.

Figure 2:
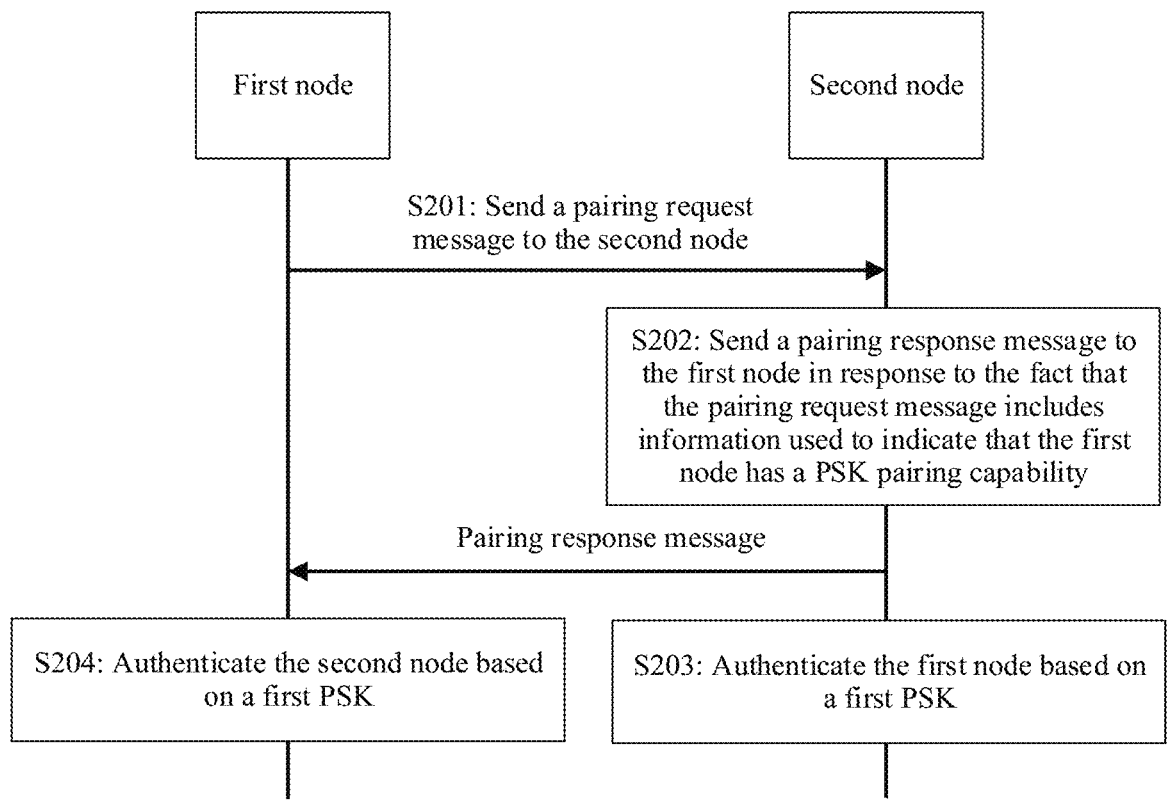
FIG. 2 is a flowchart of a Bluetooth pairing method according to an embodiment of this application.

FIG. 2 is a schematic flowchart of a Bluetooth pairing method according to an embodiment of this application. The method includes but is not limited to the following steps.

Step S201: A first node sends a pairing request message to a second node.

Specifically, the pairing request message includes information used to indicate whether the first node has a pre-shared key (PSK) pairing capability. If a first PSK shared with the second node exists on the first node, the first node has the PSK pairing capability. Correspondingly, if the first PSK shared with the second node does not exist on the first node, the first node does not have the PSK pairing capability.

Figure 3:
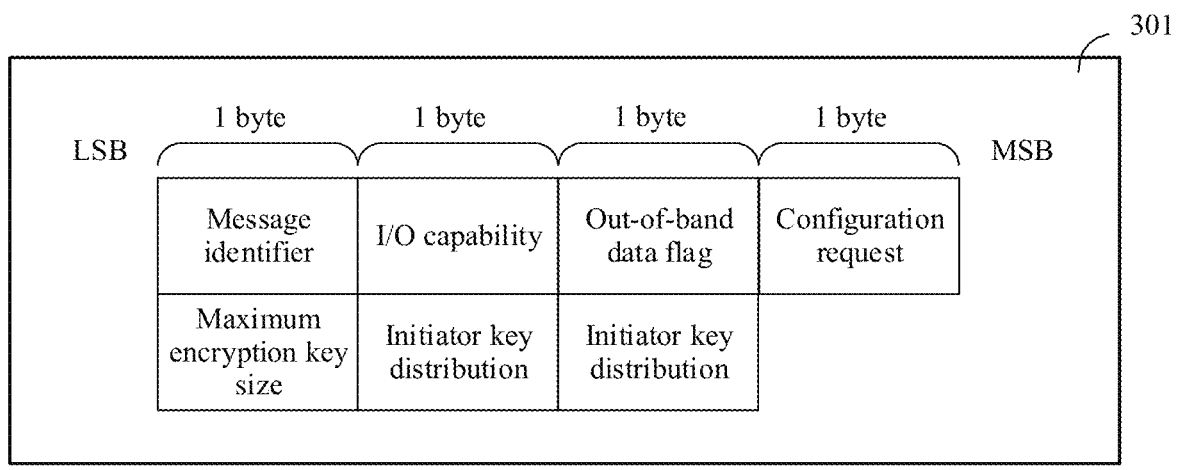
FIG. 3 is a schematic diagram of a frame structure of a pairing request message according to an embodiment of this application.

That the pairing request message includes information used to indicate whether the first node has a PSK pairing capability may be specifically implemented in the following several manners:

Implementation 1: The pairing request message includes an input/output capability IOC field, and the IOC field includes the information used to indicate whether the first node has a PSK pairing capability. For example, refer to FIG. 3. FIG. 3 is a schematic diagram of a possible pairing request message according to an embodiment of this application. The pairing request message 301 includes fields such as a message code, an I/O capability (IOC), an out-of-band data flag (OOB Data Flag), a configuration request (AuthReq), a maximum encryption key size, initiator key distribution, and responder key distribution. The Code is used to indicate a type of a message, for example, 0x01 indicates a request message, and 0x02 indicates a response message. The AuthReq may include identifiers such as Bonding_Flags (BF), Man-In-The-Middle (MITM), secure connections (SC), and keypress. The maximum encryption key size is used to indicate a supported longest key length (usually ranges from 7 bytes to 16 bytes). The initiator key distribution and the responder key distribution are used to indicate a key distribution method. A most significant bit (MSB)

is a most significant weighted bit of binary digits, and is similar to the leftmost bit of decimal digits. Correspondingly, a least significant bit (LSB) is a least significant weighted bit of the binary digits, and is similar to the rightmost bit of the decimal digits.

The IOC field is used to indicate an input/output capability of the first node. Table 2 shows a value of the IOC field and a description corresponding to the value provided in this embodiment of this application. It can be learned that when the value of the IOC field in the pairing request message is 0x05, it may indicate that the first node has the PSK pairing capability. Correspondingly, when the value of the IOC field is another value, it may indicate that the first node does not have the PSK pairing capability. Further, when the value of the IOC field is another value, the input/output capability of the first node may be specifically indicated. For example, when the value of the IOC field is 0x01, it may indicate that the input/output capability of the first node is DisplayOnly.

TABLE 2

A value of an IOC and a description corresponding to the value

| Value | Description |
|---|---|
| 0x00 | DisplayOnly |
| 0x01 | DisplayYesNo |
| 0x02 | KeyboardOnly |
| 0x03 | NoInputNoOutput |
| 0x04 | KeyboardDisplay |
| 0x05 | PSK pairing capability (Pre-shared key) |
| 0x06 to 0xFF | Reserved value (Reserved for future use) |

Figure 4:
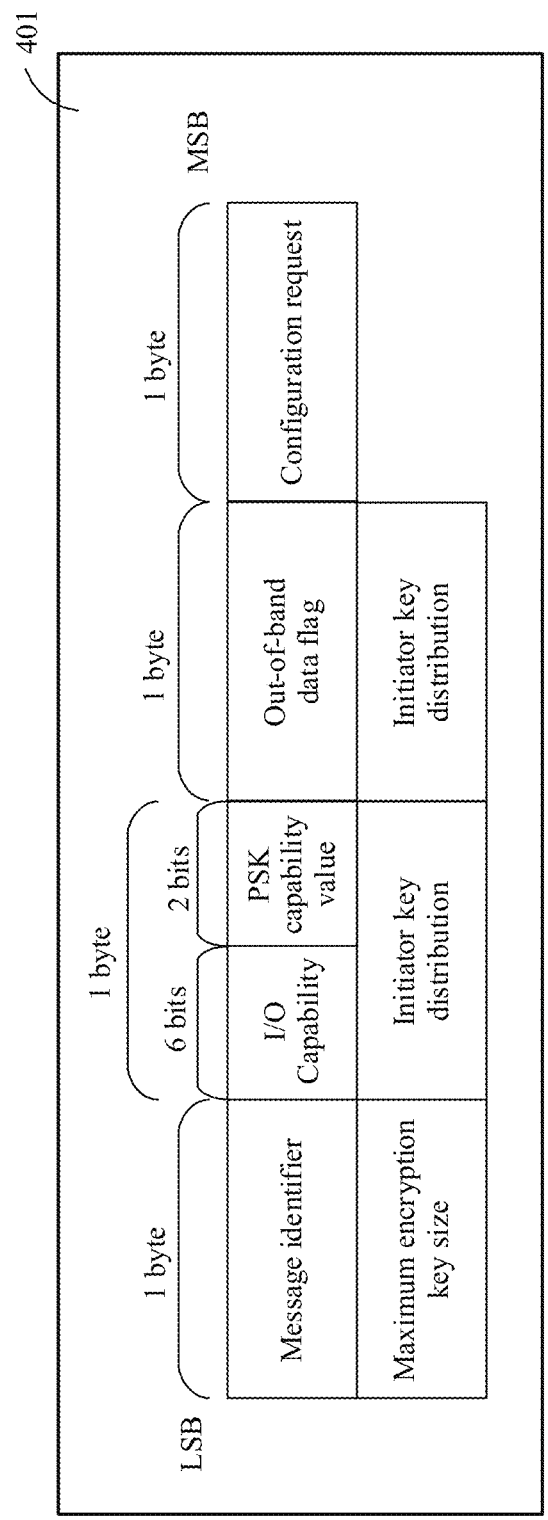
FIG. 4 is a schematic diagram of a frame structure of another pairing request message according to an embodiment of this application.

Implementation 2: The pairing request message includes an IOC field, one part of bits in the IOC field include a PSK capability value of the first node, and the PSK capability value of the first node is used to indicate whether the first node has the PSK pairing capability. FIG. 4 is a schematic diagram of a possible pairing request message according to an embodiment of this application. The pairing request message 701 includes fields such as Code, IOC, OOB Data Flag, AuthReq, Maximum Encryption Key Size, Initiator Key Distribution, and Responder Key Distribution.

The IOC field includes eight bits (one byte), and two bits in the IOC field are used to indicate whether the first node has the PSK pairing capability. Specifically, two bits in the IOC field include the PSK capability value of the first node, and the PSK capability value of the first node is used to indicate whether the first node has the PSK pairing capability. Table 3 shows a possible PSK capability value and a description corresponding to the value provided in this embodiment of this application. For example, a PSK capability value "01" indicates that the first node has the PSK pairing capability or that a first PSK shared with the second node exists. Therefore, PSK-based pairing may be supported. For another example, a PSK capability value "00" indicates that the first node does not have the PSK pairing capability or that a first PSK shared with the second node does not exist. In this case, PSK-based pairing is not supported, and pairing needs to be performed in another mode.

TABLE 3

A PSK capability value and a description corresponding to the value

| Value | Description |
|---|---|
| 00 | No PSK pairing capability (No Pre-shared key) |
| 01 | PSK pairing capability (Pre-shared key) |
| 10 | Reserved value (Reserved for future use) |
| 11 | Reserved value (Reserved for future use) |

It may be understood that, in this embodiment of this application, an example in which one part of bits are two bits is used. In specific implementation, one part of bits may be other bits, for example, three bits. "000" indicates no PSK pairing capability, "001" indicates PSK pairing capability, and "002" to "111" are used as reserved values.

Refer to FIG. 4. Optionally, another part of bits in the IOC field may be used to indicate the input/output capability of the first node, so that the second node can determine a pairing mode based on the input/output capability of the first node. For example, a value of six bits in the IOC field is 0x01, indicating that the input/output capability of the first node is DisplayOnly. If an input/output capability of the second node is KeyboardDisplay, matching may be performed between the first node and the second node in a passkey entry (PE) mode.

Figure 5:
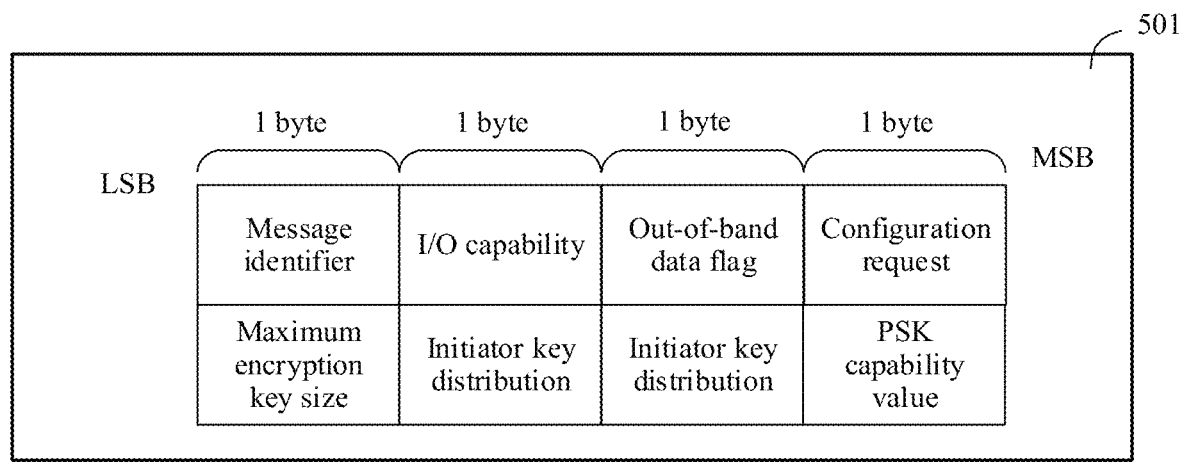
FIG. 5 is a schematic diagram of a frame structure of still another pairing request message according to an embodiment of this application.

Implementation 3: The pairing request message includes a PSK capability field, the PSK capability field includes the PSK capability value of the first node, and the PSK capability value of the first node is used to indicate whether the first node has the PSK pairing capability. FIG. 5 is a schematic diagram of a possible pairing request message according to an embodiment of this application. The pairing request message 501 includes fields such as Code, IOC, OOB Data Flag, AuthReq, Maximum Encryption Key Size, Initiator Key Distribution, Responder Key Distribution, and a PSK capability.

The PSK capability field is used to indicate whether the first node has the PSK pairing capability. Specifically, the PSK capability field includes the PSK capability value of the first node, and the PSK capability value of the first node is used to indicate whether the first node has the PSK pairing capability. Table 4 shows another possible PSK capability value and a description corresponding to the value provided in this embodiment of this application. For example, a PSK capability value 0x01 indicates that the first node has the PSK pairing capability or that a first PSK shared with the second node exists. Therefore, PSK-based pairing may be supported. For another example, a PSK capability value 0x00 indicates that the first node does not have the PSK pairing capability or that a first PSK shared with the second node does not exist. In this case, PSK-based pairing is not supported, and pairing needs to be performed in another mode.

TABLE 4

A PSK capability value and a description corresponding to the value

| Value | Description |
|---|---|
| 0x00 | No PSK pairing capability (No Pre-shared key) |
| 0x01 | PSK pairing capability (Pre-shared key) |
| 0x02 to 0xFF | Reserved value (Reserved for future use) |

Refer to FIG. 4. Optionally, the IOC may be used to indicate the input/output capability of the first node, so that the second node can determine a pairing mode based on the input/output capability of the first node. For example, a value in the IOC field is 0x01, indicating that the input/output capability of the first node is DisplayOnly.

Optionally, before sending the pairing request message, the first node first determines whether to share a PSK with the second node. For ease of description, the PSK shared by the first node and the second node is referred to as the first PSK in embodiments of this application. If the first node determines to share the first PSK with the second node, the pairing request message includes information indicating that the first node has the PSK pairing capability. Correspondingly, if the first PSK shared with the second node does not exist on the first node, the pairing request message includes information indicating that the first node does not have the PSK pairing capability.

Further optionally, the first node stores a correspondence between a device identifier of at least one node and a corresponding PSK. A device identifier of a node may be an identification (ID) of the node, a media access control (MAC) address, a domain name, a domain address, or another user-defined identifier. The first node may obtain a device identifier of the second node (for ease of description, the device identifier of the second node is referred to as a second device identifier), and determine, based on the second device identifier, whether the first PSK corresponding to the second device identifier exists on the first node. If the first PSK corresponding to the second device identifier exists on the first node, it indicates that the first node has the PSK pairing capability. For example, refer to Table 5. Table 5 shows a possible correspondence between a device identifier of a node and a PSK provided in this embodiment of this application. If the second device identifier obtained by the first node is "ID1", it may be learned that a PSK corresponding to "ID1" is "PSK1", and the first node may add, to the pairing request message, the information indicating that the first node has the PSK pairing capability.

TABLE 5

Correspondence between a node identifier and a key configuration type

| Device identifier | PSK |
|---|---|
| ID1 | PSK1 |
| ID2 | PSK2 |
| ID3 | PSK3 |
| ID4 | PSK4 |

It may be understood that the first node sends the pairing request message to the second node, and correspondingly, the second node receives the pairing request message from the first node, to obtain message content in the pairing request message.

S202: The second node sends a pairing response message to the first node in response to the fact that the pairing request message includes the information used to indicate that the first node has the PSK pairing capability.

Specifically, the pairing request message includes the information used to indicate that the first node has the PSK pairing capability. Therefore, the second node may learn, based on the information, that the first node has the PSK pairing capability, which indicates that PSK-based pairing may be performed between the first node and the second node. Therefore, the second node sends the pairing response message to the first node.

The pairing response message is used to indicate to perform pairing by using the first PSK shared by the first node and the second node. Specifically, there may be the following two cases.

Case 1: The pairing response message includes information indicating a pairing mode. For example, the pairing response message includes a "pairing mode 05", and the "pairing mode 05" corresponds to PSK-based pairing, that is, indicates the first node to perform pairing by using the first PSK shared by the first node and the second node.

Case 2: The pairing response message includes information indicating that the second node has the PSK pairing capability, and indicates the first node to perform pairing by using the first PSK shared by the first node and the second node. Specifically, that the pairing response message includes information indicating that the second node has the PSK pairing capability may have the following several implementation solutions.

Implementation solution 1: The pairing response message includes an input/output capability IOC field, and the IOC field includes information used to indicate whether the second node has the PSK pairing capability. For example, when a value of the IOC field in the pairing response message is 0x05, it may indicate that the second node has the PSK pairing capability. Correspondingly, when the value of the IOC field is another value, it may indicate that the first node does not have the PSK pairing capability, so as to indicate that the first node cannot perform PSK-based pairing. Further, when the value of the IOC field is another value, the input/output capability of the second node may be specifically indicated. For example, when the value of the IOC field is 0x01, it may indicate that the input/output capability of the second node is DisplayOnly.

Implementation solution 2: The pairing response message includes an IOC field, one part of bits in the IOC field include a PSK capability value of the second node, and the PSK capability value of the second node is used to indicate whether the second node has the PSK pairing capability. For example, two bits in the IOC field include the PSK capability value of the first node, and the PSK capability value "01" indicates that the second node has the PSK pairing capability or the first PSK shared with the first node exists. Therefore, PSK-based pairing may be supported. Optionally, if the PSK capability value is "00", it may indicate that the second node does not have information about the PSK pairing capability or that the first PSK shared with the first node does not exist. In this case, PSK-based pairing is not supported, and pairing needs to be performed in another pairing mode.

It may be understood that, in this embodiment of this application, an example in which the one part of bits are two bits is used. In specific implementation, the one part of bits may be other bits, for example, three bits. "000" indicates no PSK pairing capability, "001" indicates PSK pairing capability, and "002" to "111" are used as reserved values.

Optionally, another part of bits in the IOC field may be used to indicate the input/output capability of the second node, so that the first node can determine another pairing mode based on the input/output capability of the first node. For example, a value of six bits in the IOC field is 0x04, indicating that the input/output capability of the second node is KeyboardDisplay. If the input/output capability of the first node is DisplayOnly, matching may be performed between the first node and the second node in a passkey entry (PE) mode.

Implementation solution 3: The pairing response message includes a PSK capability field, the PSK capability field includes the PSK capability value of the second node, and the PSK capability value of the second node is used to indicate whether the second node has the PSK pairing capability. For example, the PSK capability value "0x01"

indicates that the second node has the PSK pairing capability or the first PSK shared with the first node exists. Therefore, PSK-based pairing may be supported. Optionally, if the PSK capability value is "0x00", it may indicate that the second node does not have information about the PSK pairing capability or that the first PSK shared with the first node does not exist. In this case, PSK-based pairing is not supported, and pairing needs to be performed in another mode.

Optionally, the pairing response message further includes an IOC field, and the IOC field may be used to indicate the input/output capability of the second node, so that the first node can determine a pairing mode based on the input/output capability of the second node. For example, a value in the IOC field is 0x04, indicating that the input/output capability of the first node is KeyboardDisplay.

Optionally, before sending the pairing response message, the second node first determines whether the first PSK shared with the first node exists. If the second node determines to share the first PSK with the first node, the pairing response message includes information indicating to perform PSK-based pairing. Correspondingly, if the first PSK shared with the second node does not exist on the second node, a pairing failure message may be sent to the first node, or information indicating no PSK pairing capability is carried in the pairing response message, or the input/output capability of the second node is carried in the pairing response message to determine another pairing mode.

Further optionally, the second node stores a correspondence between a device identifier of at least one node and a corresponding PSK. The second node may obtain a device identifier of the first node (for ease of description, the device identifier of the first node is referred to as a first device identifier), and determine, based on the first device identifier, whether the first PSK corresponding to the first device identifier exists on the second node. If the first PSK corresponding to the first device identifier exists on the second node, it indicates that the first PSK shared with the first node exists on the second node.

Optionally, when the pairing request message further includes the input/output capability of the first node, the second node may determine a first pairing mode based on the input/output capability of the first node and the input/output capability of the second node. For example, refer to FIG. 6. FIG. 6 is a possible manner of determining the first pairing mode according to an embodiment of this application. An area 601 is an I/O capability of the first node, and an area 602 is an I/O capability of the second node. It can be learned that, the first pairing mode is determined based on the input/output capability of the first node and the input/output capability of the second node, and the first pairing mode may be numeric comparison (NC), just work (JW), or passkey entry (PE). For example, if the I/O capability of the first node is DisplayYesNo, and the I/O capability of the second node is DisplayYesNo, a corresponding pairing mode is the numeric comparison mode.

It should be noted that an out-of-band mode usually needs to be completed based on another device. Therefore, a corresponding out-of-band data flag (OOB Data Flag) needs to be carried in the pairing request message to indicate to use the out-of-band mode for pairing.

Further optionally, when a plurality of pairing modes are supported between the first node and the second node, the second node may determine a pairing mode based on the pairing request message and preset pairing mode priority information, to send, to the first node, response messages indicating different pairing modes. The second node may preferentially select PSK-based pairing, or select a pairing mode with a higher priority based on priorities of the pairing modes. For example, the pairing mode priority information indicates that when the first node and the second node share a PSK, pairing performed by using the PSK shared by the first node and the second node has a highest priority in the plurality of pairing modes. For another example, the pairing mode priority information may be: a priority of PSK-based pairing is 2, a priority of the numeric comparison mode is 3, and a priority of the passkey entry mode is 1. When both the first node and the second node have the PSK pairing capability, if the pairing mode corresponding to the I/O capability of the first node and the I/O capability of the second node is the passkey entry mode, because the priority of the passkey entry mode is higher than the priority of the PSK-based pairing, the second node may select the passkey entry mode for pairing. Correspondingly, if the pairing mode corresponding to the I/O capability of the first node and the I/O capability of the second node is the numeric comparison mode, because the priority of the PSK-based pairing is higher than the priority of the numeric comparison mode, the second node may select PSK-based pairing.

It may be understood that the second node sends the pairing response message to the first node, and correspondingly, the first node receives the pairing response message fed back by the second node, to obtain message content in the pairing response message.

Step S203: The second node authenticates the first node based on the first PSK.

Specifically, the first node shares the first PSK with the second node. Therefore, the second node may authenticate the first node by using the first PSK. Specifically, there may be the following several manners.

Manner 1: The second node sends first authentication data to the first node. The first authentication data may be encrypted by using the first PSK or encrypted by using a session key derived from the first PSK. If the first node can decrypt the authentication data and feed back corresponding response data, the second node successfully authenticates the first node.

Manner 2: The second node receives a first authentication parameter from the first node. The first authentication parameter is generated by the first node based on the first PSK. For example, the first authentication parameter C1 is generated by the first node based on the first PSK by using a key derivation algorithm KDF, for example, C1=KDF (first PSK). Because the second node also has the first PSK, the second node may verify the first authentication parameter in a corresponding manner. For example, the second node may determine, based on KDF1 (first PSK) and the first authentication parameter C1, whether the first PSK on the first node is consistent with the first PSK on the second node, to authenticate an identity of the first node. Further, the second node may generate a second check parameter check2 based on the first PSK on the second node, for example, check2=KDF (first PSK). If the second check parameter is the same as the first authentication parameter, the first PSK on the first node is consistent with the first PSK on the second node, so that an identity of the first node can be authenticated.

Optionally, the parameter participating in generation of the first authentication parameter may further include another parameter exchanged between the first node and the second node, for example, one or more of a freshness parameter, a public key, a configuration parameter, and a pairing message. For details, refer to the following cases.

Case 1: The second node sends a freshness parameter to the first node (for ease of description, the freshness parameter sent by the second node is referred to as a second freshness parameter). The freshness parameter may include at least one of a NONCE, a counter, a sequence number, and the like that are obtained (or generated) by the second node. The first node generates the first authentication parameter C1 based on the second freshness parameter N2 and the first PSK, for example, C1=KDF (N2, first PSK). The second node receives the first authentication parameter C1 from the first node, and generates the second check parameter check2 by using a same method, for example, check2=KDF (N2, first PSK). If the second check parameter is the same as the first authentication parameter, the first PSK on the first node is consistent with the first PSK on the second node, so that the identity of the first node can be authenticated.

Case 2: A shared key is pre-generated (or obtained) between the second node and the first node. The shared key is generated through negotiation between the first node and the second node by exchanging a first public key and a second public key. The first node generates the first authentication parameter C1 based on the second freshness parameter N2, the first PSK, the first public key PK1, and the second public key PK2, for example, C1=KDF (N2, first PSK, PK1, PK2). The second node receives the first authentication parameter C1 from the first node, and generates the second check parameter check2 by using a same method, for example, check2=KDF (N2, first PSK, PK1, PK2). If the second check parameter is the same as the first authentication parameter, the first PSK on the first node is consistent with the first PSK on the second node, so that the identity of the first node can be authenticated.

Step S204: The first node authenticates the second node based on the first PSK.

Specifically, the first node shares the first PSK with the second node. Therefore, the first node may authenticate the second node by using the first PSK. The following briefly describes authentication manners. For detailed descriptions, refer to corresponding descriptions of the second node side in step S203. The first node may authenticate the second node based on the first PSK in the following manners:

Manner 1: The first node sends second authentication data to the second node. The second authentication data may be encrypted by using the first PSK or encrypted by using a session key derived from the first PSK. If the second node can decrypt the authentication data and feed back corresponding response data, the first node successfully authenticates the second node.

Manner 2: The first node receives a second authentication parameter from the second node. The second authentication parameter is generated by the second node based on the first PSK. For example, the second authentication parameter C2 is generated by the second node based on the first PSK by using a key derivation algorithm KDF, for example, C2=KDF (first PSK). Because the first node also has the first PSK, the first node may verify the second authentication parameter in a corresponding manner. For example, the first node may determine, based on KDF (first PSK) and the second authentication parameter C2, whether the first PSK on the second node is consistent with the first PSK on the first node, to authenticate an identity of the second node. Further, the first node may generate a first check parameter check1 based on the first PSK on the first node, for example, check1=KDF (first PSK). If the first check parameter is the same as the second authentication parameter, the first PSK on the second node is consistent with the first PSK on the first node, so that the identity of the second node can be authenticated.

Optionally, the parameter participating in generation of the second authentication parameter may further include another parameter exchanged between the first node and the second node, for example, one or more of a freshness parameter, a public key, a configuration parameter, and a pairing message. For details, refer to the following cases.

Case 1: The first node sends a freshness parameter to the second node (for ease of description, the freshness parameter sent by the first node is referred to as a first freshness parameter). The freshness parameter may include at least one of a NONCE, a counter, a sequence number, and the like that are obtained (or generated) by the first node. The second node generates the second authentication parameter C2 based on the first freshness parameter N1 and the first PSK, for example, C2=KDF (N1, first PSK). The first node receives the second authentication parameter C2 from the second node, and generates the first check parameter check1 by using a same method, for example, check1=KDF (N1, first PSK). If the first check parameter is the same as the second authentication parameter, the first PSK on the second node is consistent with the first PSK on the first node, so that the identity of the second node can be authenticated.

It should be noted that, to describe the solution more clearly, a plurality of steps are used to explain how to verify the authentication parameter. In actual processing, the authentication parameter may also be verified in one step. For example, when the second authentication parameter C2 is verified, the first check parameter check1 is only an intermediate result, that is, the first node may directly verify whether C2 is the same as KDF (N1, first PSK).

Case 2: A shared key is pre-generated (or obtained) between the first node and the second node. The shared key is generated through negotiation between the first node and the second node by exchanging a first public key and a second public key. The second node generates the second authentication parameter C2 based on the first freshness parameter N1, the first PSK, the first public key PK1, and the second public key PK2, for example, C2=KDF1 (N1, first PSK, PK1, PK2). The first node receives the second authentication parameter C2 from the second node, and generates the first check parameter check1 by using a same method, for example, check1=KDF1 (N1, first PSK, PK1, PK2). If the first check parameter is the same as the second authentication parameter, the first PSK on the second node is consistent with the first PSK on the first node, so that the identity of the second node can be authenticated.

Optionally, in a case in which a first pairing request message includes the PSK capability value of the first node, the second node may authenticate correctness of the PSK capability value of the first node, to avoid tampering of the PSK capability value of the first node. Specifically, the second node receives a third authentication parameter from the first node. The third authentication parameter is generated by the first node based on the PSK capability value of the first node. The second node generates a fourth check parameter based on the PSK capability value of the first node obtained from the pairing request message, and determines correctness of the PSK capability value of the first node based on the fourth check parameter and the third authentication parameter. For example, in the first pairing request message, if the PSK capability value of the first node is "01", the first node generates the third authentication parameter C3 by using the KDF, for example, C3=KDF ("01"). Correspondingly, the second node generates the fourth check parameter check4=KDF ("01"). If the third authentication parameter C3 is equal to the fourth check parameter check4, correctness authentication on the PSK capability value of the first node succeeds.

Optionally, in a case in which a first response request message includes the PSK capability value of the second node, the second node may authenticate correctness of the PSK capability value of the second node. Specifically, the first node receives a fourth authentication parameter from the second node. The fourth authentication parameter is generated by the second node based on the PSK capability value of the second node. The first node generates a third check parameter based on the PSK capability value of the second node obtained from the pairing response message, and determines correctness of the PSK capability value of the second node based on the third check parameter and the fourth authentication parameter. For example, in a first pairing response message, if the PSK capability value of the second node is "01", the second node generates the fourth authentication parameter C4 by using the KDF, for example, C4=KDF ("01"). Correspondingly, the first node generates the third check parameter check3=KDF ("01"). If the fourth authentication parameter C4 is equal to the third check parameter check3, correctness authentication on the PSK capability value of the second node succeeds.

Further optionally, the parameter participating in generation of the third authentication parameter C3 and the fourth authentication parameter C4 may further include another parameter, for example, one or more parameters of a shared key Kdh, a first random number, a second random number, the first public key, and the second public key. For example, the third authentication parameter C3 may be generated based on the shared key Kdh, the first random number N1, the second random number N2, the PSK capability value "01" of the first node, the first public key PK1, and the second public key PK2 by using a cryptographic algorithm f3, for example, C3=f3 (Kdh, N1, N2, "01", PK1, PK2). Correspondingly, the fourth authentication parameter may be generated based on the shared key Kdh, the first random number N1, the second random number N2, the PSK capability value "01" of the second node, the first public key PK1, and the second public key PK2 by using the cryptographic algorithm f3, for example, C4=f3 (Kdh, N1, N2, "01", PK1, PK2).

It may be understood that step S203 and step S204 may correspond to an authentication phase 1 in a Bluetooth pairing process. The foregoing verification on correctness of the PSK capability values of the first node and the second node may correspond to an authentication phase 2 in the Bluetooth pairing process. In this case, the third authentication parameter is a verification parameter verify E1 in the authentication phase 2, and the fourth authentication parameter is a verification parameter verify E2 in the authentication phase 2.

In the method shown in FIG. 2, a PSK is a secret value shared by the first node and the second node, and a PSK shared with the second node is predefined or configured on the first node. Therefore, the pairing request message may include the information indicating that the first node has the PSK pairing capability. Correspondingly, a PSK (referred to as the first PSK for ease of description) shared with the first node is also predefined or preconfigured on the second node. The second node may authenticate the first node based on the first PSK, to determine that the identity of the first node is trusted, so that subsequent pairing can be successful. In this way, an identity of a node for which a PSK is preconfigured or defined is usually trusted. This avoids successful pairing between the first node or the second node and an untrusted node, and improves security in a node pairing process.

Figure 7:
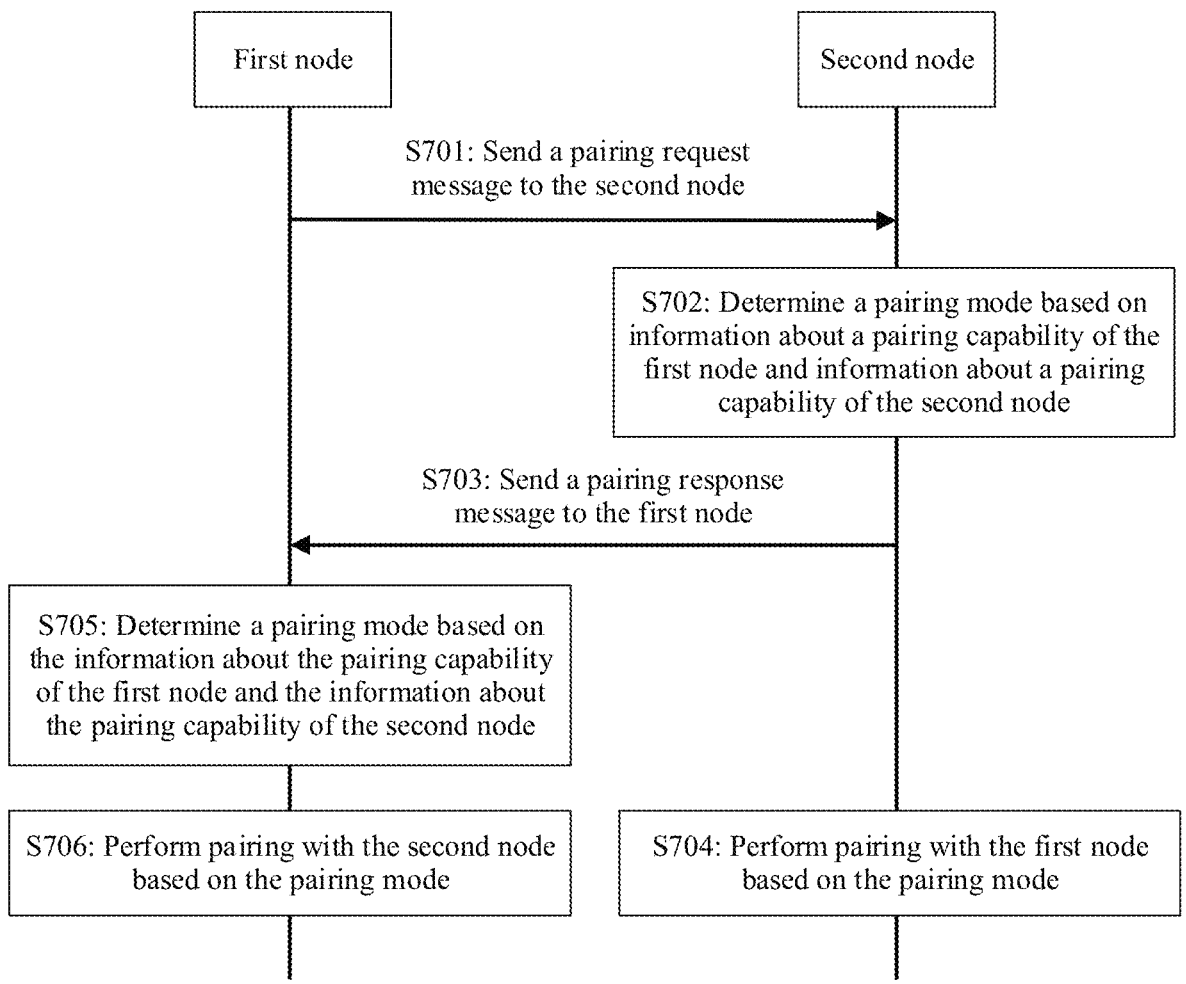
FIG. 7 is a flowchart of another Bluetooth pairing method according to an embodiment of this application.

FIG. 7 is a schematic flowchart of a Bluetooth pairing method according to an embodiment of this application. The method includes but is not limited to the following steps.

Step S701: A first node sends a pairing request message to a second node.

Specifically, the pairing request message includes information used to indicate a pairing capability of the first node. The pairing capability of the first node includes whether the first node has a PSK pairing capability. Further optionally, the pairing capability of the first node further includes an I/O capability of the first node.

For example, as shown in FIG. 3, an IOC field in the pairing request message 301 includes information indicating that the first node has the PSK pairing capability.

For another example, as shown in FIG. 4, one part of bits in an IOC field in the pairing request message 401 include a PSK capability value of the first node, and the PSK capability value is used to indicate whether the first node has the PSK pairing capability. Another part of bits in the IOC field include the I/O capability of the first node.

For still another example, as shown in FIG. 5, a PSK capability field in the pairing request message 501 includes a PSK capability value of the first node, and the PSK capability value is used to indicate whether the first node has the PSK pairing capability. An IOC field in the pairing request message 701 includes the I/O capability of the first node.

It may be understood that the first node sends the pairing request message to the second node, and correspondingly, the second node receives the pairing request message from the first node, to obtain message content in the pairing request message.

Step S702: The second node determines a pairing mode based on information about a pairing capability of the first node and information about a pairing capability of the second node.

Specifically, the pairing mode may include modes such as PSK-based pairing, numeric comparison NC, just work JW, or passkey entry PE. That the second node determines a pairing mode based on information about a pairing capability of the first node and information about a pairing capability of the second node may include at least the following several cases.

Case 1: The pairing request message includes information indicating that the first node has the PSK pairing capability. If the second node determines to share a first PSK with the first node, the second node performs pairing by using the first PSK shared by the first node and the second node. Specifically, the first node has the PSK pairing capability. If the second node has the first PSK shared with the first node, it is determined that the pairing mode is PSK-based pairing.

The second node may obtain a device identifier of the first node. If the first PSK corresponding to the device identifier of the first node exists on the second node, it indicates that the first PSK shared with the first node exists on the second node, and the second node has the PSK pairing capability.

It may be understood that, in this case, the PSK-based pairing is preferred. If both the first node and the second node have the PSK pairing capability, pairing is performed by using the shared first PSK.

Case 2: The pairing request message includes information indicating that the first node does not have the PSK pairing capability, or the second node does not have the PSK pairing capability (or the first PSK shared with the first node does not exist on the second node), and the pairing request message further includes the I/O capability of the first node. In this case, the second node determines the pairing mode based on the I/O capability of the first node and an I/O capability of the second node. For example, as shown in FIG. 6, if the I/O capability of the first node is DisplayYesNo, and the I/O capability of the second node is DisplayYesNo, a corresponding pairing mode is the numeric comparison mode.

Case 3: The pairing request message includes information indicating that the first node has the PSK pairing capability, and the first PSK shared with the first node exists on the second node. The pairing request message further includes the I/O capability of the first node. The second node determines a first pairing mode based on the I/O capability of the first node and the I/O capability of the second node, and determines the pairing mode based on a priority of the first pairing mode and a priority of PSK-based pairing. For example, the priority of the PSK-based pairing is 2, a priority of the numeric comparison mode is 3, and a priority of the passkey entry mode is 1. When both the first node and the second node have the PSK pairing capability, if a pairing mode corresponding to the I/O capability of the first node and the I/O capability of the second node is the passkey entry mode, because the priority of the passkey entry mode is higher than the priority of the PSK-based pairing, the second node may select the passkey entry mode for pairing. Correspondingly, if a pairing mode corresponding to the I/O capability of the first node and the I/O capability of the second node is the numeric comparison mode, because the priority of the PSK-based pairing is higher than the priority of the numeric comparison mode, the second node may select PSK-based pairing.

Optionally, the second node may select to support a pairing mode with relatively high security. For example, the second node supports only PSK-based pairing, numeric comparison, and passkey entry modes. For a node that is determined as the just work mode based on an I/O capability, the second node may send a pairing failure message, to prevent the second node from pairing with an untrusted node in the just work mode.

Step S703: The second node sends a pairing response message to the first node.

Specifically, the pairing response message includes the information used to indicate the pairing capability of the second node. The pairing capability of the second node includes whether the second node has the PSK pairing capability, and the pairing capability of the second node further includes the I/O capability of the second node.

For example, an IOC field in the pairing response message includes information indicating that the second node has the PSK pairing capability.

For another example, one part of bits in an IOC field in the pairing response message include a PSK capability value of the second node, and the PSK capability value is used to indicate whether the second node has the PSK pairing capability. Another part of bits in the IOC field include the I/O capability of the second node.

For still another example, a PSK capability field in the pairing response message includes a PSK capability value of the second node, and the PSK capability value is used to indicate whether the second node has the PSK pairing capability. The IOC field in the pairing response message includes the I/O capability of the first node.

It may be understood that the pairing capability of the second node is related to the pairing mode selected by the second node. If the pairing mode determined by the second node is PSK-based pairing, the pairing response message includes information indicating that the second node has the PSK capability. Correspondingly, if the pairing mode determined by the second node is determined based on the I/O capability of the first node and the I/O capability of the second node, the pairing response message includes the I/O capability of the second node.

It may be understood that the second node sends the pairing response message to the first node, and correspondingly, the first node receives the pairing response message fed back by the second node, to obtain message content in the pairing response message.

Step S704: The second node performs pairing with the first node based on the pairing mode.

Specifically, if the second node determines that the pairing mode is PSK-based pairing, the second node authenticates the first node by using the first PSK shared with the first node. For a detailed process, refer to specific descriptions in step S203. Details are not described herein again.

If the second node determines that the pairing mode is the first pairing mode determined based on the I/O capability of the first node and the I/O capability of the second node, pairing is performed according to a corresponding pairing procedure.

Step S705: The first node determines a pairing mode based on the information about the pairing capability of the first node and the information about the pairing capability of the second node.

Specifically, the pairing mode may include modes such as PSK-based pairing, numeric comparison, just work, or passkey entry. That the first node determines a pairing mode based on the information about the pairing capability of the first node and the information about the pairing capability of the second node may include at least the following several cases.

Case 1: The pairing response message includes the information indicating that the second node has the PSK pairing capability. If the first node also has the PSK pairing capability (or a PSK shared with the second node exists on the first node), the first node performs pairing by using the first PSK shared by the first node and the second node.

It may be understood that, in this case, the PSK-based pairing is preferred. If both the first node and the second node have the PSK pairing capability, pairing is performed by using the shared first PSK.

Case 2: The pairing response message includes information indicating that the second node does not have the PSK pairing capability, or the first node does not have the PSK pairing capability (or the first PSK shared with the second node does not exist on the first node), and the pairing response message further includes the I/O capability of the second node. In this case, the first node determines the pairing mode based on the I/O capability of the first node and an I/O capability of the second node. For example, as shown in FIG. 6, if the I/O capability of the first node is DisplayYesNo, and the I/O capability of the second node is DisplayYesNo, a corresponding pairing mode is the numeric comparison mode.

Case 3: The pairing response message includes the information indicating that the second node has the PSK pairing capability, and the first PSK shared with the second node exists on the first node. The pairing response message further includes the I/O capability of the second node. The first node determines the first pairing mode based on the I/O capability of the first node and the I/O capability of the second node, and determines the pairing mode based on the priority of the first pairing mode and the priority of the PSK-based pairing.

Optionally, the first node may select to support a pairing mode with relatively high security. For example, the first node supports only PSK-based pairing, numeric comparison, and passkey entry modes. For a node that is determined as the just work mode based on an I/O capability, the first node may send a pairing failure message, to prevent the first node from pairing with an untrusted node in the just work mode.

In a possible solution, according to a protocol stipulation, a manner used by the second node to determine the pairing mode is also used by the first node to determine the pairing mode, so that manners of determining the pairing mode by the first node and the second node are the same.

Step S706: The first node performs pairing with the second node based on the pairing mode.

Specifically, if the first node determines that the pairing mode is PSK-based pairing, the first node authenticates the second node by using the first PSK shared with the second node. For a detailed process, refer to specific descriptions in step S204. Details are not described herein again.

If the second node determines that the pairing mode is the first pairing mode determined based on the I/O capability of the first node and the I/O capability of the second node, pairing is performed according to a corresponding pairing procedure.

In the embodiment shown in FIG. 7, the pairing request message includes the information about the pairing capability of the first node, and the pairing response message includes the information about the pairing capability of the second node. The first node and the second node may determine a corresponding pairing mode based on a requirement and based on the information about the pairing capability of the first node and the information about the pairing capability of the second node. For example, the second node may determine, by using a method such as preferentially selecting PSK-based pairing or selecting a pairing mode based on a priority of each mode, a pairing mode that meets a requirement of the second node.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

The foregoing method embodiment shown in FIG. 2 includes many possible implementation solutions. The following separately illustrates some of the implementation solutions with reference to FIG. 8, FIG. 9A and FIG. 9B, and FIG. 10A and FIG. 10B. It should be noted that, for descriptions of related concepts, operations, or logical relationships that are not explained in FIG. 8, FIG. 9A and FIG. 9B, and FIG. 10A and FIG. 10B, refer to corresponding descriptions in the embodiment shown in FIG. 2. Therefore, details are not described again.

Figure 8:
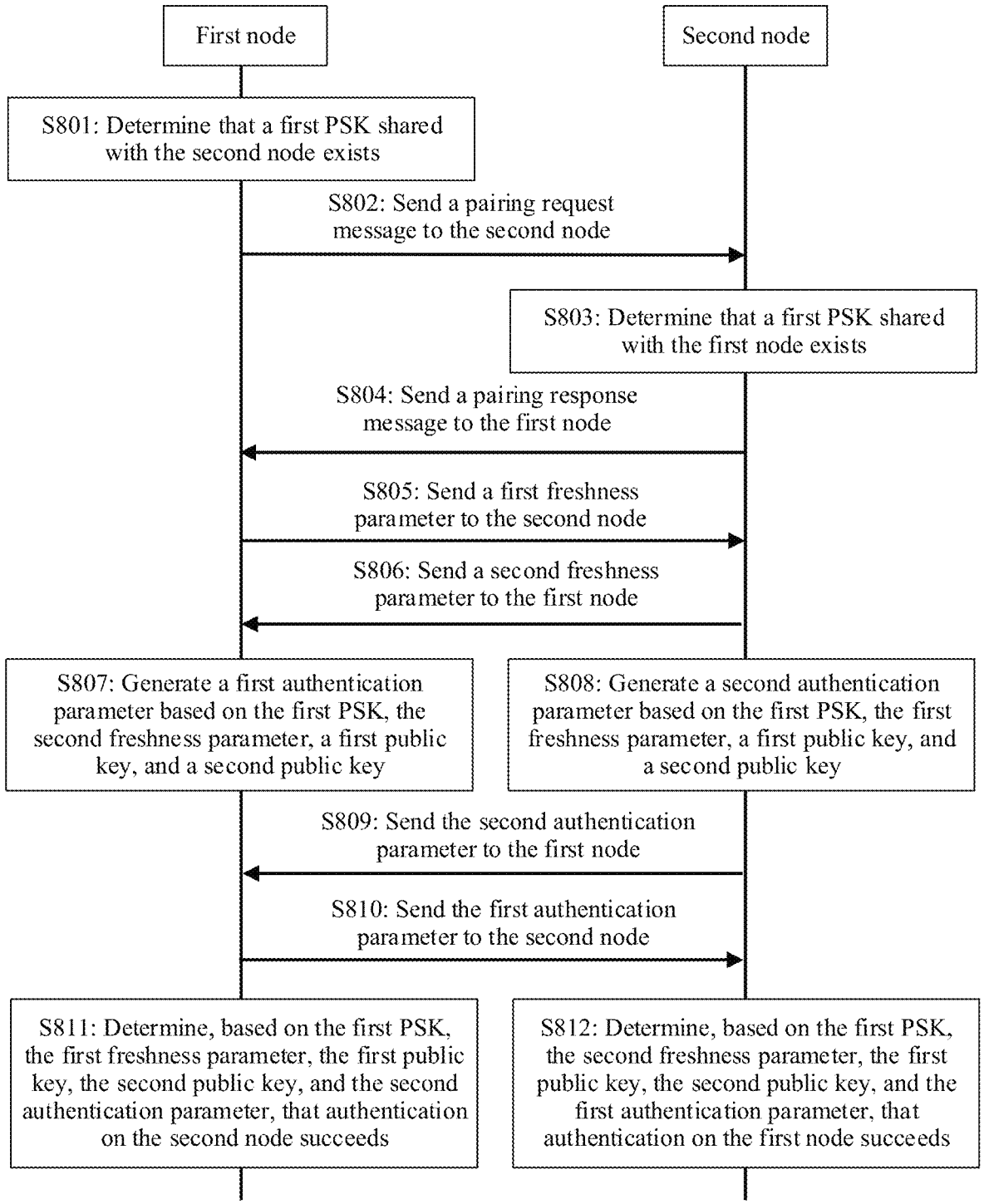
FIG. 8 is a flowchart of another Bluetooth pairing method according to an embodiment of this application.

FIG. 8 is a schematic flowchart of a Bluetooth pairing method according to an embodiment of this application. The method includes but is not limited to the following steps.

Step S801: A first node determines that a first PSK shared with a second node exists.

Specifically, the first node obtains a second device identifier of the second node. If it is determined, based on the second device identifier, that the first PSK corresponding to the second device identifier exists on the first node, it indicates that the first PSK shared with the second node exists on the first node.

Further, if the first PSK corresponding to the second device identifier exists on the first node, it indicates that the first node has a PSK pairing capability.

Step S802: The first node sends a pairing request message to the second node.

Specifically, the pairing request message includes information used to indicate that the first node has the PSK pairing capability.

It may be understood that the first node sends the pairing request message to the second node, and correspondingly, the second node receives the pairing request message from the first node, to obtain message content in the pairing request message.

Step S803: The second node determines that the first PSK shared with the first node exists.

Specifically, the second node obtains a first device identifier of the first node. If it is determined, based on the first device identifier, that the first PSK corresponding to the first device identifier exists on the second node, it indicates that the first PSK shared with the first node exists on the second node. Both the first node and the second node have the PSK pairing capability. Therefore, pairing may be performed by using the first PSK shared by the second node and the second node.

Optionally, if the first PSK shared with the first node does not exist on the second node, the second node may send a pairing failure message to the first node.

Step S804: The second node sends a pairing response message to the first node.

Specifically, the pairing response message is used to indicate to perform pairing by using the first PSK shared by the first node and the second node.

It may be understood that the second node sends the pairing response message to the first node, and correspondingly, the first node receives the pairing response message fed back by the second node, to obtain message content in the pairing response message.

Step S805: The first node sends a first freshness parameter to the second node.

Specifically, the first freshness parameter may be at least one of a NONCE, a counter, a sequence number, and the like that are obtained (or generated) by the first node. The freshness parameter is used by the second node to generate a second authentication parameter, so that the first node authenticates the second node based on the second authentication parameter.

It may be understood that the first node sends the first freshness parameter to the second node, and correspondingly, the second node receives the first freshness parameter from the first node.

Step S806: The second node sends a second freshness parameter to the first node.

Specifically, the second freshness parameter may be at least one of a NONCE, a counter, a sequence number, and the like that are obtained (or generated) by the second node. The freshness parameter is used by the first node to generate a first authentication parameter, so that the second node authenticates the first node based on the first authentication parameter.

It may be understood that the second node sends the second freshness parameter to the first node, and correspondingly, the first node receives the second freshness parameter from the second node.

Step S807: The first node generates the first authentication parameter based on the first PSK, the second freshness parameter, a first public key, and a second public key.

Specifically, a shared key is pre-generated (or obtained) between the second node and the first node. The shared key is generated through negotiation between the first node and the second node by exchanging the first public key and the second public key.

The first node generates the first authentication parameter C1 based on the second freshness parameter N2, the first PSK, the first public key PK1, and the second public key PK2, for example, C1=KDF (N2, first PSK, PK1, PK2). The KDF is a key derivation algorithm negotiated in advance or specified in a protocol.

Step S808: The second node generates the first authentication parameter based on the first PSK, the first freshness parameter, a first public key, and a second public key.

Specifically, the second node generates the first authentication parameter C2 based on the first freshness parameter N1, the first PSK, the first public key PK1, and the second public key PK2, for example, C2=KDF (N1, first PSK, PK1, PK2).

Step S809: The second node sends the second authentication parameter to the first node.

It may be understood that the second node sends the second authentication parameter to the first node, and correspondingly, the first node receives the second authentication parameter from the second node.

Step S810: The first node sends the first authentication parameter to the second node.

It may be understood that the first node sends the first authentication parameter to the second node, and correspondingly, the second node receives the first authentication parameter from the first node.

Step S811: The first node determines, based on the first PSK, the first freshness parameter, the first public key, the second public key, and the second authentication parameter, that authentication on the second node succeeds.

Specifically, the first node receives the second authentication parameter C2 from the second node, and generates a first check parameter check1 by using a same method, for example, check1=KDF1 (N1, first PSK, PK1, PK2). If the first check parameter is the same as the second authentication parameter, the first PSK on the second node is consistent with the first PSK on the first node, so that an identity of the second node can be authenticated.

Step S812: The second node determines, based on the first PSK, the second freshness parameter, the first public key, the second public key, and the first authentication parameter, that authentication on the first node succeeds.

Specifically, the second node receives the first authentication parameter C1 from the first node, and generates a second check parameter check2 by using a same method, for example, check2=KDF (N2, first PSK, PK1, PK2). If the second check parameter is the same as the first authentication parameter, the first PSK on the first node is consistent with the first PSK on the second node, so that an identity of the first node can be authenticated.

Figure 9A:
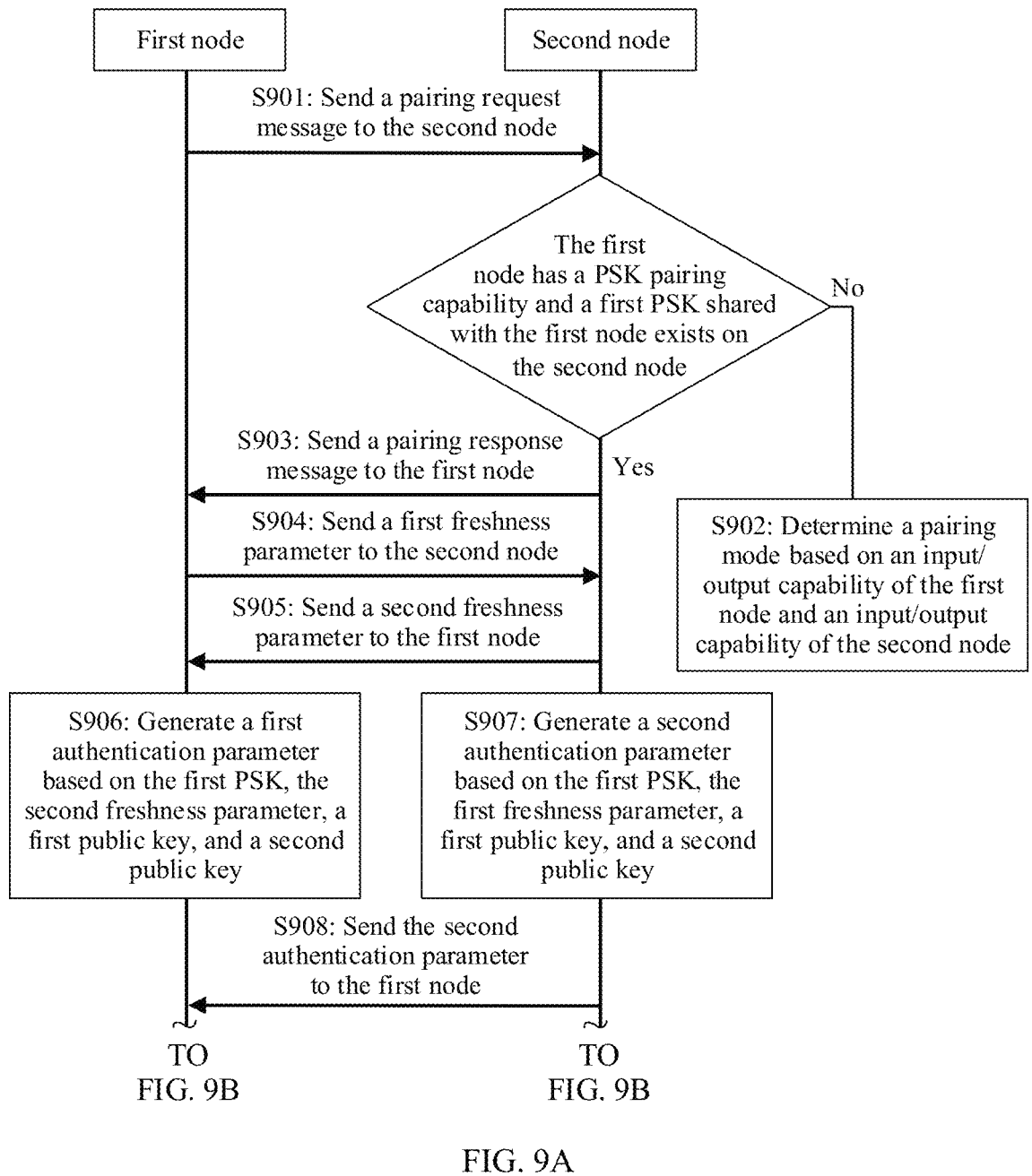
FIG. 9A and FIG. 9B are a flowchart of another Bluetooth pairing method according to an embodiment of this application.
Figure 9B:
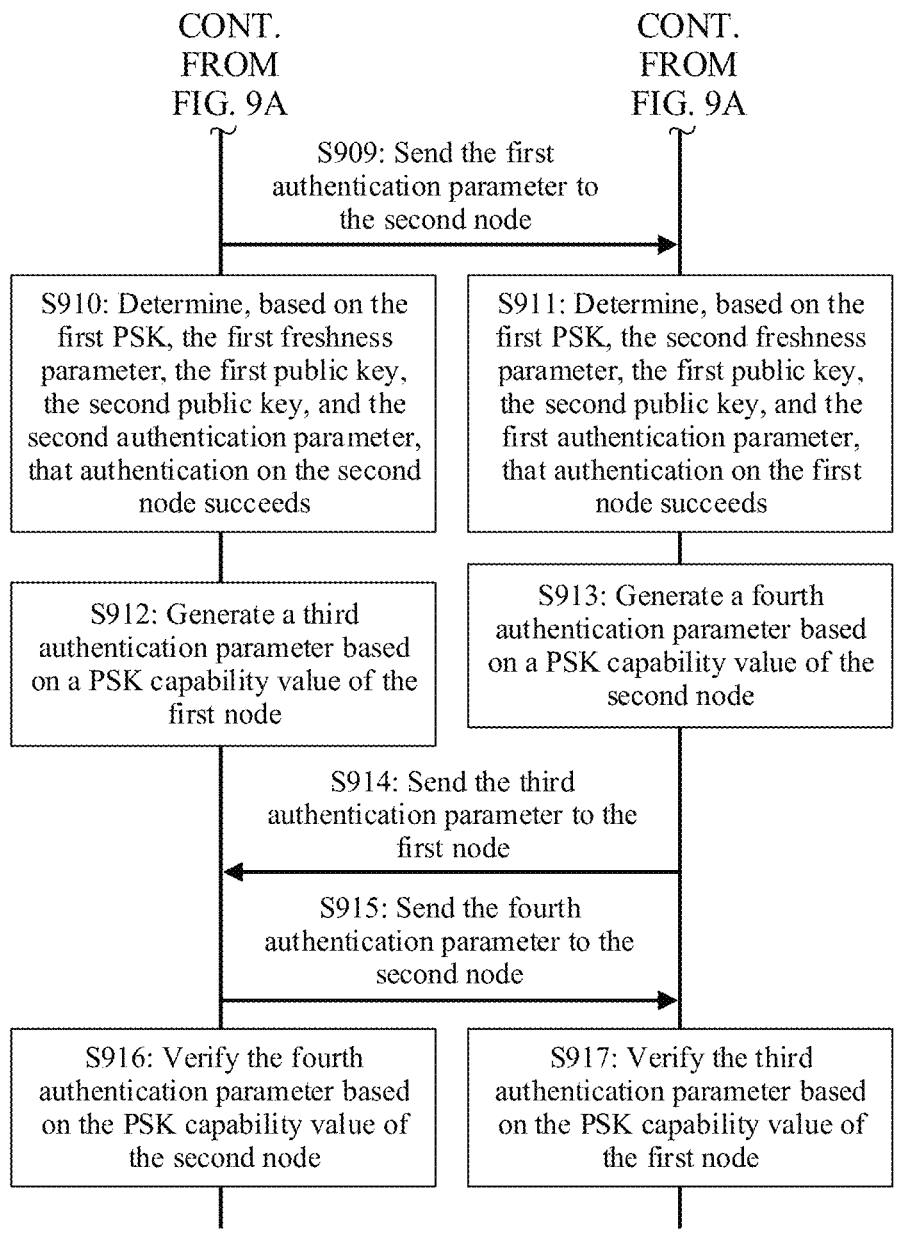

FIG. 9A and FIG. 9B are a schematic flowchart of a Bluetooth pairing method according to an embodiment of this application. The method includes but is not limited to the following steps.

Step S901: A first node sends a pairing request message to a second node.

Specifically, the pairing request message includes information used to indicate whether the first node has a PSK pairing capability. Further optionally, the pairing request message further includes an I/O capability of the first node.

For example, as shown in FIG. 4, one part of bits in an IOC field in the pairing request message 401 include a PSK capability value of the first node, and the PSK capability value is used to indicate whether the first node has the PSK pairing capability. Another part of bits in the IOC field include the I/O capability of the first node.

For another example, as shown in FIG. 5, a PSK capability field in the pairing request message 501 includes a PSK capability value of the first node, and the PSK capability value is used to indicate whether the first node has the PSK pairing capability. An IOC field in the pairing request message 501 includes the I/O capability of the first node.

It may be understood that the first node sends the pairing request message to the second node, and correspondingly, the second node receives the pairing request message from the first node, to obtain message content in the pairing request message.

Step S902: If the first node does not have the PSK pairing capability, or a first PSK shared with the first node does not exist on the second node, the second node determines a pairing mode based on an input/output capability of the first node and an input/output capability of the second node.

Specifically, the pairing request message includes information about whether the first node has the PSK pairing capability. If the first node does not have the PSK pairing capability, the second node determines the pairing mode based on the input/output capability of the first node and the input/output capability of the second node.

The second node may obtain a first device identifier of the first node. If it is determined, based on the first device identifier, that the first PSK corresponding to the first device identifier does not exist on the second node, it indicates that the first PSK shared with the first node does not exist on the second node. In this case, the second node determines the pairing mode based on the input/output capability of the first node and the input/output capability of the second node.

Step S903: If the first node has the PSK pairing capability and the first PSK shared with the first node exists on the second node, the second node sends a pairing response message to the first node.

Specifically, the pairing response message is used to indicate to perform pairing by using the first PSK shared by the first node and the second node.

It can be learned that, in this case, PSK-based pairing is preferred. If both the first node and the second node have the PSK pairing capability, pairing is performed by using the shared first PSK.

It may be understood that the second node sends the pairing response message to the first node, and correspondingly, the first node receives the pairing response message fed back by the second node, to obtain message content in the pairing response message.

Step S904: The first node sends a first freshness parameter to the second node.

Specifically, the first freshness parameter may be at least one of a NONCE, a counter, a sequence number, and the like that are obtained (or generated) by the first node. The freshness parameter is used by the second node to generate a second authentication parameter, so that the first node authenticates the second node based on the second authentication parameter.

It may be understood that the first node sends the first freshness parameter to the second node, and correspondingly, the second node receives the first freshness parameter from the first node.

Step S905: The second node sends a second freshness parameter to the first node.

Specifically, the second freshness parameter may be at least one of a NONCE, a counter, a sequence number, and the like that are obtained (or generated) by the second node. The freshness parameter is used by the first node to generate a first authentication parameter, so that the second node authenticates the first node based on the first authentication parameter.

It may be understood that the second node sends the second freshness parameter to the first node, and correspondingly, the first node receives the second freshness parameter from the second node.

Step S906: The first node generates the first authentication parameter based on the first PSK, the second freshness parameter, a first public key, and a second public key.

Specifically, a shared key is pre-generated (or obtained) between the second node and the first node. The shared key is generated through negotiation between the first node and the second node by exchanging the first public key and the second public key.

The first node generates the first authentication parameter C1 based on the second freshness parameter N2, the first PSK, the first public key PK1, and the second public key PK2, for example, C1=KDF (N2, first PSK, PK1, PK2). The KDF is a key derivation algorithm negotiated in advance or specified in a protocol.

Step S907: The second node generates the first authentication parameter based on the first PSK, the first freshness parameter, a first public key, and a second public key.

Specifically, a shared key is pre-generated (or obtained) between the second node and the first node. The shared key is generated through negotiation between the first node and the second node by exchanging the first public key and the second public key.

The second node generates the first authentication parameter C2 based on the first freshness parameter N1, the first PSK, the first public key PK1, and the second public key PK2, for example, C2=KDF (N1, first PSK, PK1, PK2). The KDF is a key derivation algorithm negotiated in advance or specified in a protocol.

Step S908: The second node sends the second authentication parameter to the first node.

It may be understood that the second node sends the second authentication parameter to the first node, and correspondingly, the first node receives the second authentication parameter from the second node.

Step S909: The first node sends the first authentication parameter to the second node.

It may be understood that the first node sends the first authentication parameter to the second node, and correspondingly, the second node receives the first authentication parameter from the first node.

Step S910: The first node determines, based on the first PSK, the first freshness parameter, the first public key, the second public key, and the second authentication parameter, that authentication on the second node succeeds.

Specifically, the first node receives the second authentication parameter C2 from the second node, and generates a first check parameter check1 by using a same method, for example, check1=KDF1 (N1, first PSK, PK1, PK2). If the first check parameter is the same as the second authentication parameter, the first PSK on the second node is consistent with the first PSK on the first node, so that an identity of the second node can be authenticated.

Step S911: The second node determines, based on the first PSK, the second freshness parameter, the first public key, second public key, and the first authentication parameter, that authentication on the first node succeeds.

Specifically, the second node receives the first authentication parameter C1 from the first node, and generates a second check parameter check2 by using a same method, for example, check2=KDF (N2, first PSK, PK1, PK2). If the second check parameter is the same as the first authentication parameter, the first PSK on the first node is consistent with the first PSK on the second node, so that an identity of the first node can be authenticated.

Step S912: The first node generates a third authentication parameter based on the PSK capability value of the first node.

For example, in the first pairing request message, if the PSK capability value of the first node is "01", the first node generates the third authentication parameter C3 by using the KDF, for example, C3=KDF ("01").

Optionally, the parameter participating in generation of the third authentication parameter C3 may further include another parameter, for example, one or more of a shared key Kdh, a first random number, a second random number, the first public key, and the second public key. For example, the third authentication parameter C3 may be generated based on the shared key Kdh, the first random number N1, the second random number N2, the PSK capability value "01" of the first node, the first public key PK1, and the second public key PK2 by using a cryptographic algorithm f3, for example, C3=f3 (Kdh, N1, N2, "01", PK1, PK2). Further optionally, step S1212 may correspond to an authentication phase 2 in the Bluetooth pairing process. In this case, the third authentication parameter is a verification parameter verify E1 in the authentication phase 2.

Step S913: The second node generates a fourth authentication parameter based on a PSK capability value of the second node.

For example, in the first pairing response message, if the PSK capability value of the second node is "01", the second node generates the fourth authentication parameter C4 by using the KDF, for example, C4=KDF ("01").

Optionally, the parameter participating in generation of the fourth authentication parameter C4 may further include another parameter, for example, one or more of the shared key Kdh, the first random number, the second random number, the first public key, and the second public key. For example, the fourth authentication parameter may be generated based on the shared key Kdh, the first random number N1, the second random number N2, the PSK capability value "01" of the second node, the first public key PK1, and the second public key PK2 by using the cryptographic algorithm f3, for example, C4=f3 (Kdh, N1, N2, "01", PK1, PK2). Further optionally, step S1213 may correspond to the authentication phase 2 in the Bluetooth pairing process. In this case, the fourth authentication parameter is a verification parameter verify E2 in the authentication phase 2.

Step S914: The second node sends the third authentication parameter to the first node.

It may be understood that the second node sends the third authentication parameter to the first node, and correspondingly, the first node receives the third authentication parameter from the second node.

Step S915: The first node sends the fourth authentication parameter to the second node.

It may be understood that the first node sends the fourth authentication parameter to the second node, and correspondingly, the second node receives the fourth authentication parameter from the first node.

Step S916: The first node verifies the fourth authentication parameter based on the PSK capability value of the second node.

Specifically, the first node may generate the third check parameter check3=KDF (the PSK capability value of the second node). If the fourth authentication parameter C4 is equal to the third check parameter check3, correctness authentication on the PSK capability value of the second node succeeds.

Optionally, if the fourth authentication parameter C4 meets the following formula: C4=f3 (Kdh, N1, N2, the PSK capability value of the second node, PK1, PK2), the first node may generate the corresponding third check parameter check3 by using a same parameter, for example, check3=f3 (Kdh, N1, N2, the PSK capability value of the second node, PK1, PK2). If the fourth authentication parameter C4 is equal to the third check parameter check3, correctness authentication on the PSK capability value of the second node succeeds.

Step S917: The second node verifies the third authentication parameter based on the PSK capability value of the first node.

Specifically, the second node may generate a fourth check parameter check4=KDF (the PSK capability value of the first node). If the third authentication parameter C3 is equal to the fourth check parameter check4, correctness authentication on the PSK capability value of the first node succeeds.

Optionally, if the third authentication parameter C3 meets the following formula: C3=f3 (Kdh, N1, N2, the PSK capability value of the first node, PK1, PK2), the second node may generate the corresponding check parameter check4 by using a same parameter, for example, check4=f3 (Kdh, N1, N2, the PSK capability value of the first node, PK1, PK2). If the third authentication parameter C3 is equal to the fourth check parameter check4, correctness authentication on the PSK capability value of the first node succeeds.

Figure 10A:
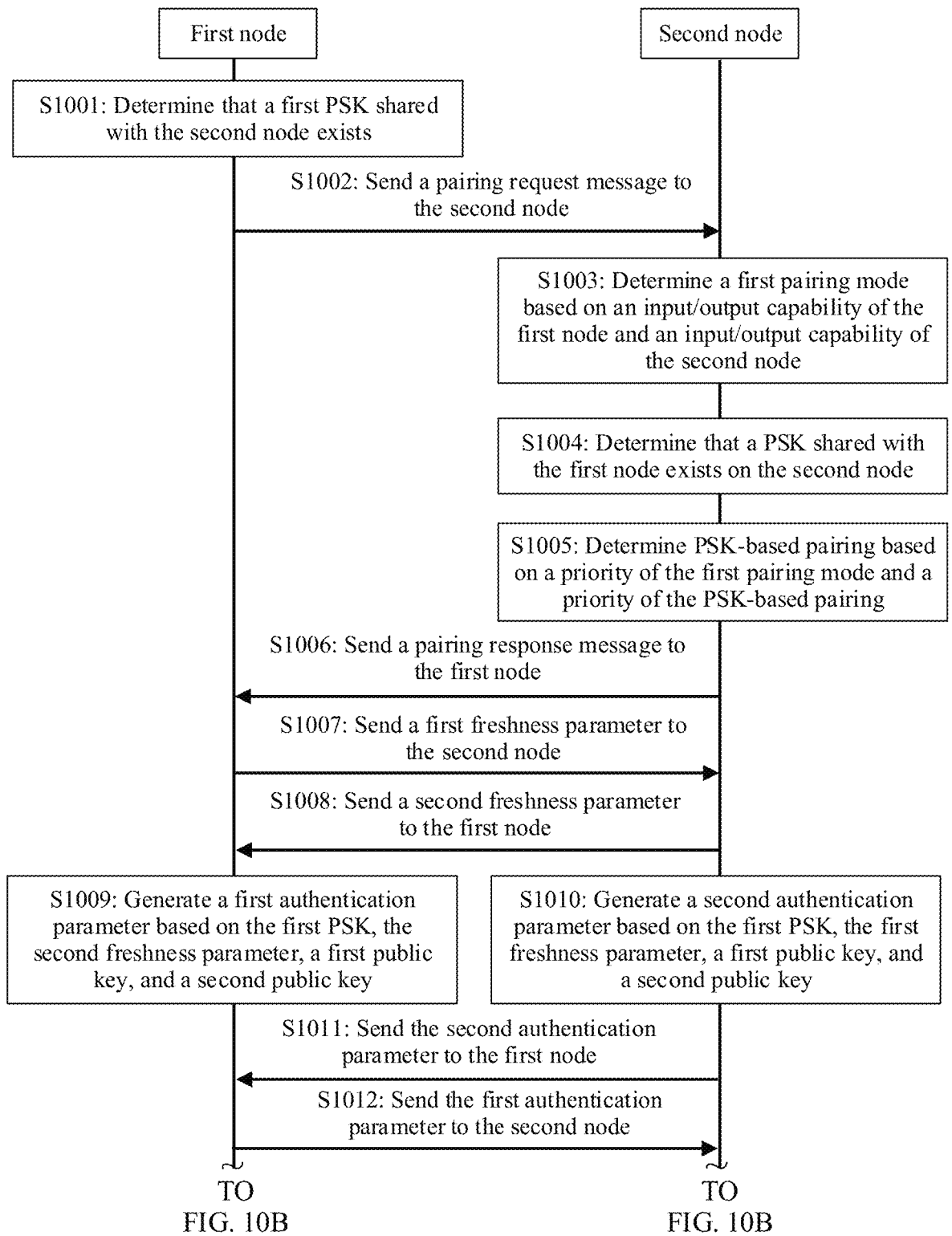
FIG. 10A and FIG. 10B are a flowchart of another Bluetooth pairing method according to an embodiment of this application.
Figure 10B:
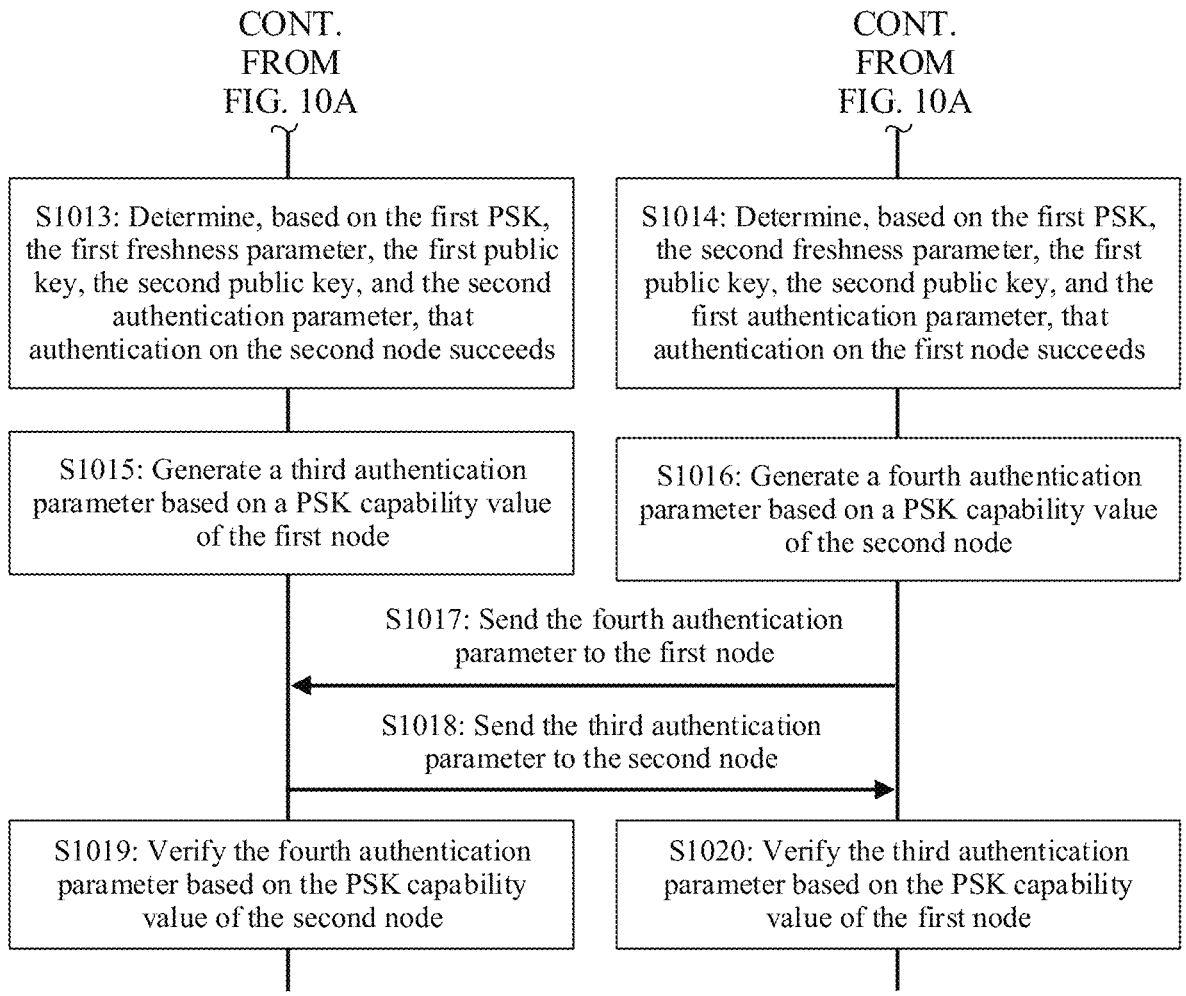

FIG. 10A and FIG. 10B are a schematic flowchart of a Bluetooth pairing method according to an embodiment of this application. The method includes but is not limited to the following steps.

Step S1001: A first node determines that a first PSK shared with a second node exists.

For a specific description, refer to the description in step S1201.

Step S1002: The first node sends a pairing request message to the second node.

For a specific description, refer to the description in step S1202.

Step S1003: The second node determines a first pairing mode based on an input/output capability of the first node and an input/output capability of the second node.

For example, refer to FIG. 6. FIG. 6 is a possible manner of determining the first pairing mode according to this embodiment of this application. An area 601 is an I/O capability of the first node, and an area 902 is an I/O capability of the second node. It can be learned that, the first pairing mode is determined based on the input/output capability of the first node and the input/output capability of the second node, and the first pairing mode may be numeric comparison (NC), just work (JW), or passkey entry (PE). For example, if the I/O capability of the first node is DisplayYesNo, and the I/O capability of the second node is DisplayYesNo, a corresponding pairing mode is numeric comparison.

Step S1004: The second node determines that a first PSK shared with the first node exists on the second node.

Specifically, the second node obtains a first device identifier of the first node. If it is determined, based on the first device identifier, that the first PSK corresponding to the first device identifier exists on the second node, it indicates that the first PSK shared with the first node exists on the second node. Both the first node and the second node have a PSK pairing capability. Therefore, pairing may be performed by using the first PSK shared by the second node and the second node.

Step S1005: The second node determines PSK-based pairing based on a priority of the first pairing mode and a priority of the PSK-based pairing.

For example, the priority of the PSK-based pairing is 2, and a priority of the numeric comparison mode is 3. When both the first node and the second node have the PSK pairing capability, if a pairing mode corresponding to the I/O capability of the first node and the I/O capability of the second node is the numeric comparison mode, because the priority of the PSK-based pairing is higher than the priority of the numeric comparison mode, the second node may select PSK-based pairing.

Step S1006: The second node sends a pairing response message to the first node.

Specifically, the pairing response message is used to indicate to perform pairing by using the first PSK shared by the first node and the second node.

It may be understood that the second node sends the pairing response message to the first node, and correspondingly, the first node receives the pairing response message fed back by the second node, to obtain message content in the pairing response message.

Step S1007: The first node sends a first freshness parameter to the second node.

For a specific description, refer to the description in step S904.

Step S1008: The second node sends a second freshness parameter to the first node.

For a specific description, refer to the description in step S905.

Step S1009: The first node generates a first authentication parameter based on the first PSK, the second freshness parameter, a first public key, and a second public key.

For a specific description, refer to the description in step S906.

Step S1010: The second node generates a first authentication parameter based on the first PSK, the first freshness parameter, a first public key, and a second public key.

For a specific description, refer to the description in step S907.

Step S1011: The second node sends the second authentication parameter to the first node.

It may be understood that the second node sends the second authentication parameter to the first node, and correspondingly, the first node receives the second authentication parameter from the second node.

Step S1012: The first node sends the first authentication parameter to the second node.

It may be understood that the first node sends the first authentication parameter to the second node, and correspondingly, the second node receives the first authentication parameter from the first node.

Step S1013: The first node determines, based on the first PSK, the first freshness parameter, the first public key, the second public key, and the second authentication parameter, that authentication on the second node succeeds.

For a specific description, refer to the description in step S910.

Step S1014: The second node determines, based on the first PSK, the second freshness parameter, the first public key, the second public key, and the first authentication parameter, that authentication on the first node succeeds.

For a specific description, refer to the description in step S911.

Step S1015: The first node generates a third authentication parameter based on a PSK capability value of the first node.

For a specific description, refer to the description in step S912.

Step S1016: The second node generates a fourth authentication parameter based on a PSK capability value of the second node.

For a specific description, refer to the description in step S913.

Step S1017: The second node sends the third authentication parameter to the first node.

It may be understood that the second node sends the third authentication parameter to the first node, and correspondingly, the first node receives the third authentication parameter from the second node.

Step S1018: The first node sends the fourth authentication parameter to the second node.

It may be understood that the first node sends the fourth authentication parameter to the second node, and correspondingly, the second node receives the fourth authentication parameter from the first node.

Step S1019: The first node verifies the fourth authentication parameter based on the PSK capability value of the second node.

For a specific description, refer to the description in step S916.

Step S1020: The second node verifies the third authentication parameter based on the PSK capability value of the first node.

For a specific description, refer to the description in step S917.

The method in embodiments of this application is described above in detail, and an apparatus in embodiments of this application is provided below.

Figure 11:
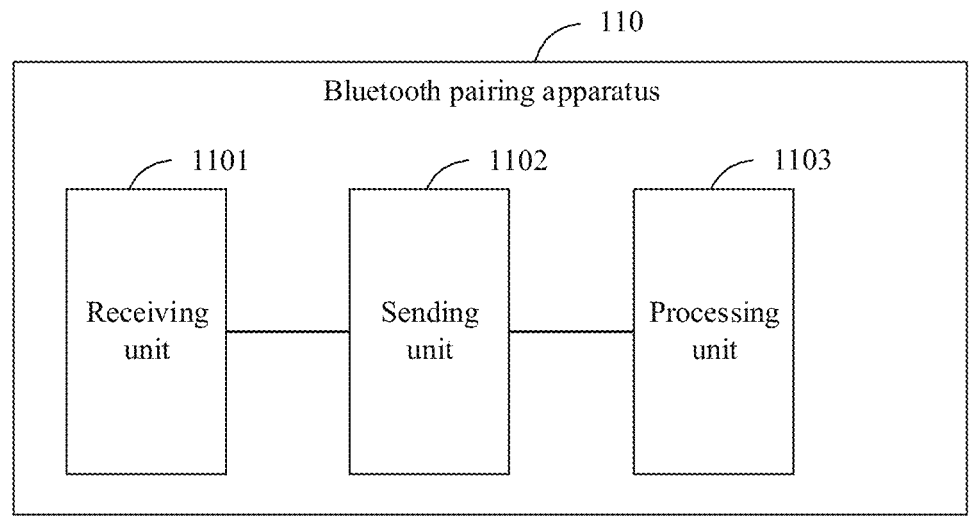
FIG. 11 is a schematic diagram of a structure of a Bluetooth pairing apparatus according to an embodiment of this application.

FIG. 11 is a schematic diagram of a structure of a Bluetooth pairing apparatus 110 according to an embodiment of this application. The apparatus 110 may be a node, or may be a component in a node, for example, a chip or an integrated circuit. The apparatus 110 may include a receiving unit 1101, a sending unit 1102, and a processing unit 1103. The Bluetooth pairing apparatus 110 is configured to implement the foregoing Bluetooth pairing method, for example, the Bluetooth pairing method in any embodiment shown in FIG. 2, FIG. 7, FIG. 8, FIG. 9A and FIG. 9B, or FIG. 10A and FIG. 10B.

It may be understood that, in apparatus embodiments of this application, division of a plurality of units or modules is merely logical division based on a function, and is not intended to limit a specific structure of the apparatus. In specific implementation, some function modules may be subdivided into smaller function modules, and some function modules may also be combined into one function module. However, regardless of whether these function modules are subdivided or combined, a general procedure performed by the apparatus 110 in a Bluetooth pairing process is the same. For example, the receiving unit 1101 and the sending unit 1102 in the apparatus 110 may also be combined into a communication unit. Usually, each unit corresponds to respective program code (or a program instruction). When the program code corresponding to the unit is run on a processor, the unit executes a corresponding procedure to implement a corresponding function.

In some possible implementations, the Bluetooth pairing apparatus 110 may be the second node in the embodiment shown in FIG. 2, FIG. 8, FIG. 9A and FIG. 9B, or FIG. 10A and FIG. 10B. The units are described as follows:

A receiving unit 1101 is configured to receive a pairing request message from a first node. The pairing request message includes information used to indicate whether the first node has a pre-shared key PSK pairing capability.

A sending unit 1102 is configured to send a pairing response message to the first node in response to the fact that the pairing request message includes information used to indicate that the first node has the PSK pairing capability. The pairing response message is used to indicate to perform pairing by using a first PSK shared by the first node and a second node.

A processing unit 1103 is configured to authenticate the first node based on the first PSK.

It can be learned that a PSK is a secret value shared by the first node and the second node, and the PSK shared with the second node is predefined or configured on the first node. Therefore, the apparatus 110 may include, in the pairing request message, the information indicating that the first node has the PSK pairing capability. Correspondingly, the first PSK shared with the first node is also predefined or preconfigured on the second node. The apparatus 110 may authenticate the first node based on the first PSK, to determine that an identity of the first node is trusted, so that subsequent pairing can be successful. In this way, an identity of a node for which a PSK is preconfigured or defined is usually trusted. This avoids successful pairing between the apparatus 110 and an untrusted node, and improves security in a node pairing process.

In a possible implementation, the processing unit 1103 is further configured to:
  determine that the second node shares the first PSK with the first node.

In another possible implementation, the processing unit is specifically configured to:
  obtain a first device identifier of the first node; and
  determine that the first PSK corresponding to the first device identifier exists.

In still another possible implementation, the pairing request message includes an input/output capability IOC field, and the IOC field includes the information used to indicate whether the first node has a PSK pairing capability.

In still another possible implementation, one part of bits in the IOC field include a PSK capability value of the first node, and the PSK capability value of the first node is used to indicate whether the first node has the PSK pairing capability.

Another part of bits in the IOC field are used to indicate an input/output capability of the first node.

In still another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation, the processing unit 1103 is further configured to determine the pairing response message based on the pairing request message and preset pairing mode priority information. The pairing mode priority information indicates that when the first node and the second node share a PSK, pairing performed by using the PSK shared by the first node and the second node has a highest priority in a plurality of pairing modes.

In still another possible implementation, the receiving unit 1101 is further configured to receive a first authentication parameter from the first node.

The processing unit 1103 is further configured to verify the first authentication parameter based on the first PSK.

In still another possible implementation, the processing unit 1103 is further configured to generate a second authentication parameter based on the first PSK.

The sending unit is further configured to send the second authentication parameter to the first node.

In still another possible implementation, the receiving unit 1101 is further configured to receive a third authentication parameter from the first node.

The processing unit 1103 is further configured to generate a fourth check parameter based on the PSK capability value of the first node.

The processing unit 1103 is further configured to determine, based on the fourth check parameter and the third authentication parameter, that correctness authentication on the PSK capability value of the first node succeeds.

The processing unit 1103 is further configured to generate a fourth authentication parameter based on a PSK capability value of the second node.

The sending unit 1102 is further configured to send the fourth authentication parameter to the first node.

It should be noted that for implementation of each unit, refer to corresponding descriptions in the embodiment shown in FIG. 2, FIG. 8, FIG. 9A and FIG. 9B, or FIG. 10A and FIG. 10B.

In some possible implementations, the Bluetooth pairing apparatus 110 may be the first node in the embodiment shown in FIG. 2, FIG. 8, FIG. 9A and FIG. 9B, or FIG. 10A and FIG. 10B. The units are described as follows:

A sending unit 1102 is configured to send a pairing request message to a second node. The pairing request message includes information used to indicate that a first node has a pre-shared key PSK pairing capability.

A receiving unit 1101 is configured to receive a pairing response message fed back by the second node. The pairing response message is used to indicate to perform pairing by using a first PSK shared by the first node and the second node.

A processing unit 1103 is configured to authenticate the second node based on the first PSK.

It can be learned that a PSK is a secret value shared by the first node and the second node, and the PSK shared with the second node is predefined or configured on the first node. Therefore, the second node may indicate, in the pairing request message, that the first node has the PSK pairing capability. Correspondingly, a PSK (referred to as the first PSK for ease of description) shared with the first node is also predefined or preconfigured on the second node. The apparatus 110 may authenticate the second node based on the first PSK, to determine that an identity of the second node is trusted, so that subsequent pairing can be successful. In this way, an identity of a node for which a PSK is preconfigured or defined is usually trusted. This avoids successful pairing between the apparatus 110 and an untrusted node, and improves security in a node pairing process.

In a possible implementation, the processing unit 1103 is further configured to determine that the second node shares the first PSK with the first node.

In another possible implementation, the processing unit 1103 is specifically configured to:
obtain a second device identifier of the second node; and
determine that the first PSK corresponding to the second device identifier exists.

In still another possible implementation, the pairing request message includes an input/output capability IOC field, and the IOC field includes the information used to indicate whether the first node has a PSK pairing capability.

In still another possible implementation, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate an output capability of the first node.

In still another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation, the receiving unit 1101 is further configured to receive a second authentication parameter from the second node.

The processing unit 1103 is further configured to verify the second authentication parameter based on the first PSK.

In still another possible implementation, the processing unit 1103 is further configured to generate a first authentication parameter based on the first PSK.

The sending unit 1102 is further configured to send the first authentication parameter to the second node.

In still another possible implementation, the pairing response message includes a PSK capability value of the second node, and the PSK capability value of the second node is used to indicate that the second node has the PSK pairing capability.

The receiving unit 1101 is further configured to receive a fourth authentication parameter from the second node.

The processing unit 1103 is further configured to generate a third check parameter based on the PSK capability value of the second node.

The processing unit 1103 is further configured to determine, based on the third check parameter and the fourth authentication parameter, that correctness authentication on the PSK capability value of the first node succeeds.

The processing unit 1103 is further configured to generate a third authentication parameter based on the PSK capability value of the first node.

The sending unit 1102 is further configured to send the third authentication parameter to the second node.

It should be noted that for implementation of each unit, refer to corresponding descriptions in the embodiment shown in FIG. 2, FIG. 8, FIG. 9A and FIG. 9B, or FIG. 10A and FIG. 10B.

In some possible implementations, the Bluetooth pairing apparatus 110 may be the second node in the embodiment shown in FIG. 7. The units are described as follows:

A receiving unit 1101 is configured to receive a pairing request message from a first node. The pairing request message includes information used to indicate a pairing capability of the first node, and the pairing capability of the first node includes whether the first node has a pre-shared key PSK pairing capability and an input/output capability of the first node.

A processing unit 1103 is configured to determine a pairing mode based on the information about the pairing capability of the first node and information about a pairing capability of a second node. The pairing capability of the second node includes whether the second node has the PSK pairing capability and an input/output capability of the second node, and the pairing mode includes PSK-based pairing, numeric comparison NC, just work JW, or passkey entry PE.

A sending unit 1102 is configured to send a pairing response message to the first node. The pairing response message includes the information used to indicate the pairing capability of the second node.

The processing unit 1103 is further configured to perform pairing with the first node based on the pairing mode.

It can be learned that the pairing request message includes the information about the pairing capability of the first node, and the apparatus 110 may determine a corresponding pairing mode based on a requirement and based on whether the first node has the PSK pairing capability and the input/output capability of the first node. For example, the apparatus 110 may determine, by using a method such as preferentially selecting PSK-based pairing or selecting a pairing mode based on a priority of each mode, a pairing mode that meets a requirement of the second node.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate the input/output capability of the first node.

In another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation, the processing unit 1103 is specifically configured to:
determine, based on the information about the pairing capability of the first node, that the first node has the PSK pairing capability;
determine that the second node shares a first PSK with the first node; and
perform pairing by using the first PSK shared by the first node and the second node.

In still another possible implementation, the processing unit 1103 is specifically configured to:
obtain a first device identifier of the first node; and
determine that the first PSK corresponding to the first device identifier exists.

In still another possible implementation, the processing unit 1103 is specifically configured to:
determine, based on the information about the pairing capability of the first node, that the first node has the PSK pairing capability;
determine that the second node shares a first PSK with the first node;
determine a first pairing mode based on the input/output capability of the first node and the input/output capability of the second node, where the first pairing mode is numeric comparison NC, just work JW, or passkey entry PE; and
determine a pairing mode based on a priority of the first pairing mode and a priority of PSK-based pairing.

In still another possible implementation, the processing unit 1103 is specifically configured to:
determine, based on the information about the pairing capability of the first node, that the first node has the PSK pairing capability;
determine that the second node shares a first PSK with the first node;
determine a first pairing mode based on the input/output capability of the first node and the input/output capability of the second node, where the first pairing mode is numeric comparison NC, just work JW, or passkey entry PE; and
determine a pairing mode based on a priority of the first pairing mode and a priority of PSK-based pairing.

In still another possible implementation, the receiving unit 1101 is further configured to receive a first authentication parameter from the first node.

The processing unit is further configured to verify the first authentication parameter based on the first PSK.

In still another possible implementation, the processing unit is further configured to generate a second authentication parameter based on the first PSK.

The sending unit is further configured to send the second authentication parameter to the first node.

In still another possible implementation, the receiving unit 1101 is further configured to receive a first freshness parameter sent by the first node.

The processing unit 1103 is further configured to generate the second authentication parameter based on the first freshness parameter, a first public key, a second public key, and the first PSK. The first public key and the second public key are parameters for generating a shared key between the first node and the second node.

In still another possible implementation, the sending unit 1102 is further configured to send a second freshness parameter to the first node.

The processing unit 1103 is further configured to generate a second check parameter based on the second freshness parameter, the first public key, the second public key, and the first PSK.

The processing unit 1103 is further configured to determine, based on the second check parameter and the first authentication parameter, that the first authentication parameter is verified successfully.

In still another possible implementation, the receiving unit 1101 is further configured to receive a third authentication parameter from the first node.

The processing unit 1103 is further configured to generate a fourth check parameter based on the PSK capability value of the first node.

The processing unit 1103 is further configured to determine, based on the fourth check parameter and the third authentication parameter, that correctness authentication on the PSK capability value of the first node succeeds.

The processing unit 1103 is further configured to generate a fourth authentication parameter based on a PSK capability value of the second node.

The sending unit 1102 is further configured to send the fourth authentication parameter to the first node.

It should be noted that, for implementations of each unit, refer to the corresponding descriptions of the embodiment shown in FIG. 7.

In some possible implementations, the Bluetooth pairing apparatus 110 may be the first node in the embodiment shown in FIG. 7. The units are described as follows:

A sending unit 1102 is configured to send a pairing request message to a second node. The pairing request message includes information used to indicate a pairing capability of a first node, and the pairing capability of the first node includes whether the first node has a pre-shared key PSK pairing capability and an input/output capability of the first node.

A receiving unit 1101 is configured to receive a pairing response message from the second node. The pairing response message includes information used to indicate a pairing capability of the second node, and the pairing capability of the second node includes whether the second node has the PSK pairing capability and an input/output capability of the second node.

A processing unit 1103 is configured to determine a pairing mode based on the information about the pairing capability of the first node and the information about the pairing capability of the second node. The pairing mode includes PSK-based pairing, numeric comparison NC, just work JW, or passkey entry PE.

The processing unit 1103 is further configured to perform pairing with the second node based on the pairing mode.

It can be learned that the pairing request message includes the information about the pairing capability of the first node, and the pairing response message includes the information about the pairing capability of the second node. The apparatus 110 may determine a corresponding pairing mode based on a requirement and based on the information about the pairing capability of the first node and the information about the pairing capability of the second node. For example, the apparatus 110 may determine, by using a method such as preferentially selecting PSK-based pairing or selecting a pairing mode based on a priority of each mode, a pairing mode that meets a requirement.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate the input/output capability of the first node.

In another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate the input/output capability of the first node.

In still another possible implementation, the processing unit 1103 is further configured to:
  determine that the second node shares a first PSK with the first node;
  determine, based on the information about the pairing capability of the second node, that the first node has the PSK pairing capability; and
  perform pairing by using the first PSK shared by the first node and the second node.

In still another possible implementation, the processing unit is further configured to: obtain a second device identifier of the second node; and
  determine that the first PSK corresponding to the second device identifier exists.

In still another possible implementation, the processing unit 1103 is specifically configured to:
  determine, based on the information about the pairing capability of the second node, that the second node does not have the PSK pairing capability; and
  determine the pairing mode based on the input/output capability of the first node and the input/output capability of the second node, where the pairing mode is numeric comparison NC, just work JW, or passkey entry PE.

In still another possible implementation, the processing unit 1103 is specifically configured to:
  determine, based on the information about the pairing capability of the second node, that the first node has the PSK pairing capability;
  determine that the second node shares a first PSK with the first node;
  determine a first pairing mode based on the input/output capability of the first node and the input/output capability of the second node, where the first pairing mode is numeric comparison NC, just work JW, or passkey entry PE; and
  determine a pairing mode based on a priority of the first pairing mode and a priority of PSK-based pairing.

In still another possible implementation, the receiving unit 1101 is further configured to receive a second authentication parameter from the second node.

The processing unit 1103 is further configured to verify the second authentication parameter based on the first PSK.

In still another possible implementation, the processing unit 1103 is further configured to generate a first authentication parameter based on the first PSK.

The sending unit is further configured to send the first authentication parameter to the second node.

In still another possible implementation, the receiving unit 1101 is further configured to receive a second freshness parameter sent by the second node.

The processing unit 1103 is further configured to generate the first authentication parameter based on the second freshness parameter, a first public key, a second public key, and the first PSK. The first public key and the second public key are parameters for generating a shared key between the first node and the second node.

In still another possible implementation, the sending unit 1102 is further configured to send a first freshness parameter to the second node.

The processing unit 1103 is further configured to generate a first check parameter based on the first freshness parameter, the first public key, the second public key, and the first PSK.

The processing unit 1103 is further configured to determine, based on the first check parameter and the second authentication parameter, that the second authentication parameter is verified successfully.

In still another possible implementation, the receiving unit 1101 is further configured to receive a third authentication parameter from the first node.

The processing unit 1103 is further configured to generate a fourth check parameter based on the PSK capability value of the first node.

The processing unit 1103 is further configured to determine, based on the fourth check parameter and the third authentication parameter, that correctness authentication on the PSK capability value of the first node succeeds.

The processing unit 1103 is further configured to generate a fourth authentication parameter based on a PSK capability value of the second node.

The sending unit 1102 is further configured to send the fourth authentication parameter to the first node.

It should be noted that, for implementations of each unit, refer to the corresponding descriptions of the embodiment shown in FIG. 7.

Figure 12:
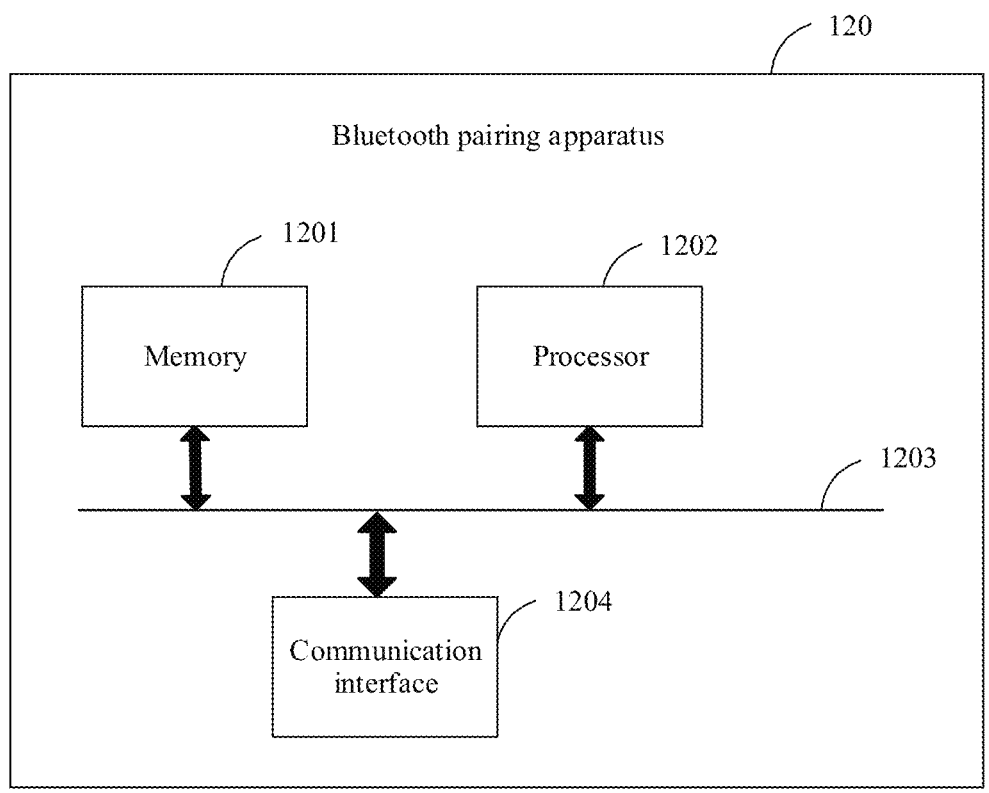
FIG. 12 is a schematic diagram of a structure of another Bluetooth pairing apparatus according to an embodiment of this application.

FIG. 12 is a schematic diagram of a structure of a communication apparatus 120 according to an embodiment of this application. The communication apparatus 120 may be a node, or may be a component in a node, for example, a chip or an integrated circuit. The apparatus 120 may include at least one memory 1201 and at least one processor 1202, and optionally may further include a bus 1203. Further optionally, a communication interface 1204 may be further included. The memory 1201, the processor 1202, and the communication interface 1204 are connected through the bus 1203.

The memory 1201 is configured to provide storage space, and the storage space may store data such as an operating system and a computer program. The memory 1201 may be one or a combination of a random access memory (RAM), a read-only memory (ROM), an erasable programmable read-only memory (EPROM), a compact disc read-only memory (CD-ROM), or the like.

The processor 1202 is a module that performs an arithmetic operation and/or a logic operation, and may be specifically one or a combination of processing modules such as a central processing unit (CPU), a graphics processing unit (GPU), a microprocessor unit (MPU), an application-specific integrated circuit (ASIC), a field programmable gate array (FPGA), and a complex programmable logic device (CPLD).

The communication interface 1204 is configured to receive data sent by an external device and/or send data to an external device, and may be a wired link interface such as an Ethernet cable, or may be a wireless (for example, Wi-Fi, Bluetooth, or general wireless transmission) link interface. Optionally, the communication interface 1204 may further include a transmitter (for example, a radio frequency transmitter or an antenna), a receiver, or the like coupled to the interface.

The processor 1202 in the apparatus 120 is configured to read the computer program stored in the memory 1201, and is configured to perform the foregoing Bluetooth pairing method, for example, the Bluetooth pairing method described in any embodiment shown in FIG. 2, FIG. 7, FIG. 8, FIG. 9A and FIG. 9B, or FIG. 10A and FIG. 10B.

In some possible implementations, the Bluetooth pairing apparatus 110 may be the first node in the embodiment shown in FIG. 2, FIG. 8, FIG. 9A and FIG. 9B, or FIG. 10A and FIG. 10B. The processor 1202 in the apparatus 120 is configured to read the computer program stored in the memory 1201, to perform the following operations:

receiving a pairing request message from a first node through the communication interface 1204, where the pairing request message includes information used to indicate whether the first node has a pre-shared key PSK pairing capability;

sending, through the communication interface 1204, a pairing response message to the first node in response to the fact that the pairing request message includes information used to indicate that the first node has the PSK pairing capability, where the pairing response message is used to indicate to perform pairing by using a first PSK shared by the first node and a second node; and authenticating the first node based on the first PSK.

It can be learned that a PSK is a secret value shared by the first node and the second node, and the PSK shared with the second node is predefined or configured on the first node. Therefore, the apparatus 120 may include, in the pairing request message, the information indicating that the first node has the PSK pairing capability. Correspondingly, the first PSK shared with the first node is also predefined or preconfigured on the second node. The apparatus 120 may authenticate the first node based on the first PSK, to determine that an identity of the first node is trusted, so that subsequent pairing can be successful. In this way, an identity of a node for which a PSK is preconfigured or defined is usually trusted. This avoids successful pairing between the apparatus and an untrusted node, and improves security in a node pairing process.

In a possible implementation, the processor 1202 is further configured to:

determine that the second node shares the first PSK with the first node.

In another possible implementation, the processor 1202 is specifically configured to:

obtain a first device identifier of the first node; and determine that the first PSK corresponding to the first device identifier exists.

In still another possible implementation, the pairing request message includes an input/output capability IOC field, and the IOC field includes the information used to indicate whether the first node has a PSK pairing capability.

In still another possible implementation, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate an input/output capability of the first node.

In still another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation, the processor 1202 is further configured to determine the pairing response message based on the pairing request message and preset pairing mode priority information. The pairing mode priority information indicates that when the first node and the second node share a PSK, pairing performed by using the PSK shared by the first node and the second node has a highest priority in a plurality of pairing modes.

In still another possible implementation, the processor 1202 is further configured to:

receive a first authentication parameter from the first node through the communication interface 1204; and verify the first authentication parameter based on the first PSK.

In still another possible implementation, the processor 1202 is further configured to:

generate a second authentication parameter based on the first PSK; and send the second authentication parameter to the first node through the communication interface 1204.

In still another possible implementation, the processor 1202 is further configured to:
receive a third authentication parameter from the first node through the communication interface 1204;
generate a fourth check parameter based on the PSK capability value of the first node;
determine, based on the fourth check parameter and the third authentication parameter, that correctness authentication on the PSK capability value of the first node succeeds;
generate a fourth authentication parameter based on a PSK capability value of the second node; and
send the fourth authentication parameter to the first node through the communication interface 1204.

It should be noted that for implementation of each unit, refer to corresponding descriptions in the embodiment shown in FIG. 2, FIG. 8, FIG. 9A and FIG. 9B, or FIG. 10A and FIG. 10B.

In some possible implementations, the Bluetooth pairing apparatus 120 may be the first node in the embodiment shown in FIG. 2, FIG. 8, FIG. 9A and FIG. 9B, or FIG. 10A and FIG. 10B. The processor 1202 in the apparatus 120 is configured to read the computer program stored in the memory 1201, to perform the following operations:
sending a pairing request message to the second node through the communication interface 1204, where the pairing request message includes information used to indicate that the first node has a pre-shared key PSK pairing capability;
receiving a pairing response message fed back by the second node through the communication interface 1204, where the pairing response message is used to indicate to perform pairing by using a first PSK shared by the first node and the second node; and
authenticating the second node based on the first PSK.

It can be learned that a PSK is a secret value shared by the first node and the second node, and the PSK shared with the second node is predefined or configured on the first node. Therefore, the second node may indicate, in the pairing request message, that the first node has the PSK pairing capability. Correspondingly, a PSK (referred to as the first PSK for ease of description) shared with the first node is also predefined or preconfigured on the second node. The apparatus 120 may authenticate the second node based on the first PSK, to determine that an identity of the second node is trusted, so that subsequent pairing can be successful. In this way, an identity of a node for which a PSK is preconfigured or defined is usually trusted. This avoids successful pairing between the apparatus 120 and an untrusted node, and improves security in a node pairing process.

In a possible implementation, the processor 1202 is further configured to determine that the second node shares the first PSK with the first node.

In another possible implementation, the processor 1202 is specifically configured to:
obtain a second device identifier of the second node; and
determine that the first PSK corresponding to the second device identifier exists.

In still another possible implementation, the pairing request message includes an input/output capability IOC field, and the IOC field includes the information used to indicate whether the first node has a PSK pairing capability.

In still another possible implementation, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate an output capability of the first node.

In still another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation, the processor 1202 is further configured to:
receive a second authentication parameter from the second node through the communication interface 1204; and
verify the second authentication parameter based on the first PSK.

In still another possible implementation, the processor 1202 is further configured to:
generate a first authentication parameter based on the first PSK; and
send the first authentication parameter to the second node through the communication interface 1204.

In still another possible implementation, the pairing response message includes a PSK capability value of the second node, and the PSK capability value of the second node is used to indicate that the second node has the PSK pairing capability. The processor 1202 is further configured to:
receive a fourth authentication parameter from the second node through the communication interface 1204;
generate a third check parameter based on the PSK capability value of the second node;
determine, based on the third check parameter and the fourth authentication parameter, that correctness authentication on the PSK capability value of the first node succeeds;
generate a third authentication parameter based on the PSK capability value of the first node; and
send the third authentication parameter to the second node through the communication interface 1204.

It should be noted that for implementation of each module, refer to corresponding descriptions in the embodiment shown in FIG. 2, FIG. 8, FIG. 9A and FIG. 9B, or FIG. 10A and FIG. 10B.

In some possible implementations, the Bluetooth pairing apparatus 120 may be the second node in the embodiment shown in FIG. 7. The processor 1202 in the apparatus 120 is configured to read the computer program stored in the memory 1201, to perform the following operations:
receiving a pairing request message from a first node through the communication interface 1204, where the pairing request message includes information used to indicate a pairing capability of the first node, and the pairing capability of the first node includes whether the first node has a pre-shared key PSK pairing capability and an input/output capability of the first node;
determining a pairing mode based on the information about the pairing capability of the first node and information about a pairing capability of the second node, where the pairing capability of the second node includes whether the second node has the PSK pairing capability and an input/output capability of the second node, and the pairing mode includes PSK-based pairing, numeric comparison NC, just work JW, or passkey entry PE;

sending a pairing response message to the first node through the communication interface 1204, where the pairing response message includes the information used to indicate the pairing capability of the second node; and performing pairing with the first node based on the pairing mode.

It can be learned that the pairing request message includes the information about the pairing capability of the first node, and the apparatus 120 may determine a corresponding pairing mode based on a requirement and based on whether the first node has the PSK pairing capability and the input/output capability of the first node. For example, the apparatus 120 may determine, by using a method such as preferentially selecting PSK-based pairing or selecting a pairing mode based on a priority of each mode, a pairing mode that meets a requirement of the second node.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate an input/output capability of the first node.

In another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation, the processor 1202 is specifically configured to:
determine, based on the information about the pairing capability of the first node, that the first node has the PSK pairing capability;
determine that the second node shares a first PSK with the first node; and
perform pairing by using the first PSK shared by the first node and the second node.

In still another possible implementation, the processor 1202 is specifically configured to:
obtain a first device identifier of the first node; and
determine that the first PSK corresponding to the first device identifier exists.

In still another possible implementation, the processor 1202 is specifically configured to:
determine, based on the information about the pairing capability of the first node, that the first node has the PSK pairing capability;
determine that the second node shares a first PSK with the first node;
determine a first pairing mode based on the input/output capability of the first node and the input/output capability of the second node, where the first pairing mode is numeric comparison NC, just work JW, or passkey entry PE; and determine a pairing mode based on a priority of the first pairing mode and a priority of PSK-based pairing.

In still another possible implementation, the processor 1202 is specifically configured to:
determine, based on the information about the pairing capability of the first node, that the first node has the PSK pairing capability;
determine that the second node shares a first PSK with the first node;
determine a first pairing mode based on the input/output capability of the first node and the input/output capability of the second node, where the first pairing mode is numeric comparison NC, just work JW, or passkey entry PE; and
determine a pairing mode based on a priority of the first pairing mode and a priority of PSK-based pairing.

In still another possible implementation, the processor 1202 is further configured to:
receive a first authentication parameter from the first node through the communication interface 1204; and
verify the first authentication parameter based on the first PSK.

In still another possible implementation, the processor 1202 is further configured to:
generate a second authentication parameter based on the first PSK; and
send the second authentication parameter to the first node through the communication interface 1204.

In still another possible implementation, the processor 1202 is further configured to:
receive, through the communication interface 1204, a first freshness parameter sent by the first node; and
generate the second authentication parameter based on the first freshness parameter, a first public key, a second public key, and the first PSK, where the first public key and the second public key are parameters for generating a shared key between the first node and the second node.

In still another possible implementation, the processor 1202 is further configured to:
send a second freshness parameter to the first node through the communication interface 1204;
generate a second check parameter based on the second freshness parameter, the first public key, the second public key, and the first PSK; and
determine, based on the second check parameter and the first authentication parameter, that the first authentication parameter is verified successfully.

In still another possible implementation, the processor 1202 is further configured to:
receive a third authentication parameter from the first node through the communication interface 1204;
generate a fourth check parameter based on the PSK capability value of the first node;
determine, based on the fourth check parameter and the third authentication parameter, that correctness authentication on the PSK capability value of the first node succeeds;
generate a fourth authentication parameter based on a PSK capability value of the second node; and
send the fourth authentication parameter to the first node through the communication interface 1204.

It should be noted that, for implementations of each module, refer to the corresponding descriptions of the embodiment shown in FIG. 7.

In some possible implementations, the Bluetooth pairing apparatus 120 may be the first node in the embodiment shown in FIG. 7. The processor 1202 in the apparatus 120 is configured to read the computer program stored in the memory 1201, to perform the following operations:

sending a pairing request message to a second node through the communication interface 1204, where the pairing request message includes information used to indicate a pairing capability of the first node, and the pairing capability of the first node includes whether the first node has a pre-shared key PSK pairing capability and an input/output capability of the first node;

receiving a pairing response message from the second node through the communication interface 1204, where the pairing response message includes information used to indicate a pairing capability of the second node, and the pairing capability of the second node includes whether the second node has the PSK pairing capability and an input/output capability of the second node;

determining a pairing mode based on the information about the pairing capability of the first node and the information about the pairing capability of the second node, where the pairing mode includes PSK-based pairing, numeric comparison NC, just work JW, or passkey entry PE; and performing pairing with the second node based on the pairing mode.

It can be learned that the pairing request message includes the information about the pairing capability of the first node, and the pairing response message includes the information about the pairing capability of the second node. The apparatus 120 may determine a corresponding pairing mode based on a requirement and based on the information about the pairing capability of the first node and the information about the pairing capability of the second node. For example, the apparatus 120 may determine, by using a method such as preferentially selecting PSK-based pairing or selecting a pairing mode based on a priority of each mode, a pairing mode that meets a requirement.

Especially for a NoInputNoOutput Bluetooth node, a DisplayOnly Bluetooth node, or a DisplayYesNo Bluetooth node, PSK-based pairing is preferentially selected, so that pairing with an untrusted node can be avoided, and communication security of the node is improved.

In a possible implementation, the pairing request message includes an input/output capability IOC field, one part of bits in the IOC field include a PSK capability value of the first node, and the PSK capability value of the first node is used to indicate whether the first node has the PSK pairing capability.

Another part of bits in the IOC field are used to indicate an input/output capability of the first node.

In another possible implementation, the pairing request message includes a PSK capability field, the PSK capability field includes the PSK capability value of the first node, and the PSK capability value of the first node is used to indicate whether the first node has the PSK pairing capability.

The pairing request message further includes an input/output capability IOC field, and the IOC field is used to indicate an input/output capability of the first node.

In still another possible implementation, the processor 1202 is further configured to:

determine that the second node shares a first PSK with the first node;

determine, based on the information about the pairing capability of the second node, that the first node has the PSK pairing capability; and perform pairing by using the first PSK shared by the first node and the second node.

In still another possible implementation, the processor 1202 is further configured to:

obtain a second device identifier of the second node; and determine that the first PSK corresponding to the second device identifier exists.

In still another possible implementation, the processor 1202 is specifically configured to:

determine, based on the information about the pairing capability of the second node, that the second node does not have the PSK pairing capability; and determine the pairing mode based on the input/output capability of the first node and the input/output capability of the second node, where the pairing mode is numeric comparison NC, just work JW, or passkey entry PE.

In still another possible implementation, the processor 1202 is specifically configured to:

determine, based on the information about the pairing capability of the second node, that the first node has the PSK pairing capability;

determine that the second node shares a first PSK with the first node;

determine a first pairing mode based on the input/output capability of the first node and the input/output capability of the second node, where the first pairing mode is numeric comparison NC, just work JW, or passkey entry PE; and determine a pairing mode based on a priority of the first pairing mode and a priority of PSK-based pairing.

In still another possible implementation, the processor 1202 is specifically configured to:

receive a second authentication parameter from the second node through the communication interface 1204; and verify the second authentication parameter based on the first PSK.

In still another possible implementation, the processor 1202 is specifically configured to:

generate a first authentication parameter based on the first PSK; and send the first authentication parameter to the second node through the communication interface 1204.

In still another possible implementation, the processor 1202 is further configured to:

receive, through the communication interface 1204, a second freshness parameter sent by the second node; and generate the first authentication parameter based on the second freshness parameter, a first public key, a second public key, and the first PSK, where the first public key and the second public key are parameters for generating a shared key between the first node and the second node.

In still another possible implementation, the processor 1202 is further configured to:

send a first freshness parameter to the second node through the communication interface 1204;

generate a first check parameter based on the first freshness parameter, the first public key, the second public key, and the first PSK; and determine, based on the first check parameter and the second authentication parameter, that the second authentication parameter is verified successfully.

In still another possible implementation, the processor 1202 is further configured to:

receive a third authentication parameter from the first node through the communication interface 1204;

generate a fourth check parameter based on the PSK capability value of the first node;
determine, based on the fourth check parameter and the third authentication parameter, that correctness authentication on the PSK capability value of the first node succeeds;
generate a fourth authentication parameter based on a PSK capability value of the second node; and
send the fourth authentication parameter to the first node through the communication interface 1204.

It should be noted that, for implementations of each module, refer to the corresponding descriptions of the embodiment shown in FIG. 7.

An embodiment of this application further provides a computer-readable storage medium. The computer-readable storage medium stores a computer program. When the computer program is run on one or more processors, the method in any embodiment shown in FIG. 2, FIG. 7, FIG. 8, FIG. 9A and FIG. 9B, or FIG. 10A and FIG. 10B is performed.

An embodiment of this application further provides a chip system. The chip system includes at least one processor, a memory, and an interface circuit. The interface circuit is configured to provide an information input/output for the at least one processor, the at least one memory stores a computer program, and when the computer program is run on one or more processors, the method in any embodiment shown in FIG. 2, FIG. 7, FIG. 8, FIG. 9A and FIG. 9B, or FIG. 10A and FIG. 10B is performed.

An embodiment of this application further provides an intelligent cockpit product. The intelligent cockpit product includes a first node (for example, an automobile cockpit domain controller CDC). The first node is the first node in any embodiment shown in FIG. 2, FIG. 7, FIG. 8, FIG. 9A and FIG. 9B, or FIG. 10A and FIG. 10B. Further, the intelligent cockpit product includes a second node (for example, at least one of modules such as a camera, a screen, a microphone, a speaker, radar, an electronic key, and a passive entry passive start system controller). The second node is the second node in any embodiment shown in FIG. 2, FIG. 7, FIG. 8, FIG. 9A and FIG. 9B, or FIG. 10A and FIG. 10B.

An embodiment of this application further provides a vehicle. The vehicle includes a first node (for example, an automobile cockpit domain controller CDC). Further, the vehicle further includes a second node (for example, at least one of modules such as a camera, a screen, a microphone, a speaker, radar, an electronic key, and a passive entry passive start system controller). The first node is the first node in any embodiment shown in FIG. 2, FIG. 7, FIG. 8, FIG. 9A and FIG. 9B, or FIG. 10A and FIG. 10B, and the second node is the second node in any embodiment shown in FIG. 2, FIG. 7, FIG. 8, FIG. 9A and FIG. 9B, or FIG. 10A and FIG. 10B.

An embodiment of this application further provides a computer program product. When the computer program product runs on one or more processors, the Bluetooth pairing method described in any embodiment shown in FIG. 2, FIG. 7, FIG. 8, FIG. 9A and FIG. 9B, or FIG. 10A and FIG. 10B may be performed. Alternatively, the vehicle may be replaced with an intelligent terminal or a transportation vehicle such as an uncrewed aerial vehicle or a robot.

All or some of the foregoing embodiments may be implemented by using software, hardware, firmware, or any combination thereof. When software is used to implement embodiments, all or some of the embodiments may be implemented in a form of a computer instruction product. When the computer instructions are loaded and executed on a computer, the procedures or functions according to embodiments of this application are all or partially implemented. The computer may be a general-purpose computer, a dedicated computer, a computer network, or another programmable apparatus. The computer instructions may be stored in a computer-readable storage medium, or may be transmitted by using a computer-readable storage medium. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk (SSD)), or the like.

Sequence adjustment, combination, or deletion may be performed on the steps in the method embodiments of this application based on an actual requirement.

Modules in the apparatus embodiments of this application may be combined, divided, or deleted based on an actual requirement.

What is claimed is:

1. A node pairing apparatus, comprising at least one processor and at least one memory, wherein the at least one memory stores program instructions for execution by, the at least one processor to:
    receive a pairing request message from a first node, wherein the pairing request message indicates whether the first node has a pre-shared key (PSK) shared with the node pairing apparatus;
    send a pairing response message to the first node in response to the pairing request message, wherein the pairing response message indicates whether the node pairing apparatus has the PSK shared with the first node; and
    authenticate the first node based on the PSK, in response to that the pairing request message indicates the first node has the PSK and the pairing response message indicates the node pairing apparatus has the PSK.

2. The apparatus according to claim 1, wherein the pairing request message indicates an input/output capability of the first node.

3. The apparatus according to claim 1, wherein the pairing response message indicates an input/output capability of the node pairing apparatus.

4. The apparatus according to claim 3, wherein the pairing response message comprises a first field, whether the node pairing apparatus has the PSK is indicated by the first field being set as a value in a first group of values, and the input/output capability of the node pairing apparatus is indicated by the first field being set as a value in a second group of values.

5. The apparatus according to claim 3, wherein the pairing response message comprises a first field comprising a plurality of bits;
    a first part of the plurality of bits in the first field indicates whether the node pairing apparatus has the PSK; and
    a second part of the plurality of bits in the first field indicates the input/output capability of the node pairing apparatus.

6. The apparatus according to claim 3, wherein the pairing response message comprises a first field and a second field;
    the first field indicates whether the node pairing apparatus has the PSK; and
    the second field indicates the input/output capability of the node pairing apparatus.

7. The apparatus according to claim 1, wherein using the PSK for authentication has a higher priority than using an authentication method corresponding to an input/output capability of the first node or the node pairing apparatus.

8. The apparatus according to claim 1, wherein the at least one memory stores the program instructions for execution by the at least one processor to:
determine that the node pairing apparatus shares the PSK with the first node.

9. The apparatus according to claim 1, wherein the pairing request message comprises an input/output capability (IOC) field, and the IOC field indicates whether the first node has the PSK.

10. The apparatus according to claim 9, wherein one part of bits in the IOC field comprises a PSK capability value of the first node, and the PSK capability value of the first node indicates whether the first node has the PSK; and
another part of bits in the IOC field indicates an input/output capability of the first node.

11. The apparatus according to claim 1, wherein the pairing request message comprises a PSK capability field, the PSK capability field comprises a PSK capability value of the first node, and the PSK capability value of the first node is used to indicate whether the first node has the PSK; and
the pairing request message further comprises an input/output capability (IOC) field, and the IOC field is used to indicate an input/output capability of the first node.

12. The apparatus according to claim 11, wherein the at least one memory stores the program instructions for execution by the at least one processor to:
determine the pairing response message based on the pairing request message and pairing mode priority information, wherein the pairing mode priority information indicates that when the first node and the node pairing apparatus share a PSK, pairing performed by using the PSK shared by the first node and the node pairing apparatus has a highest priority in a plurality of pairing modes.

13. The apparatus according to claim 1, wherein the at least one memory stores the program instructions for execution by the at least one processor to:
receive a first authentication parameter from the first node; and
verify the first authentication parameter based on the PSK.

14. The apparatus according to claim 13, wherein the at least one memory stores the program instructions for execution by the at least one processor to:
generate a second authentication parameter based on the PSK; and
send the second authentication parameter to the first node.

15. The apparatus according to claim 1, wherein the pairing request message comprises a first PSK capability value of the first node, the first PSK capability value indicates whether the first node has the PSK, and the at least one memory stores the program instructions for execution by the at least one processor to:
receive a third authentication parameter from the first node, wherein the third authentication parameter is generated based on the first PSK capability value;
generate a fourth check parameter based on the first PSK capability value; and
determine, based on the fourth check parameter and the third authentication parameter, that an authentication on the first PSK capability value succeeds.

16. The apparatus according to claim 1, wherein the at least one memory stores the program instructions for execution by the at least one processor to:
generate a fourth authentication parameter based on a second PSK capability value of the node pairing apparatus, wherein the second PSK capability value indicates whether the node pairing apparatus has the PSK; and
send the fourth authentication parameter to the first node.

17. A node pairing apparatus, comprising at least one processor and at least one memory, wherein the at least one memory stores program instructions for execution by the at least one processor to:
send a pairing request message to a second node, wherein the pairing request message indicates whether the node pairing apparatus has a pre-shared key (PSK) shared with the second node;
receive a pairing response message from the second node, wherein the pairing response message indicates whether the second node has the PSK shared with the node pairing apparatus; and
authenticate the second node based on the PSK in response to that the pairing request message indicates the node pairing apparatus has the PSK and the pairing response message indicates the second node has the PSK.

18. The apparatus according to claim 17, wherein the pairing request message indicates an input/output capability of the node pairing apparatus.

19. The apparatus according to claim 17, wherein the pairing response message indicates an input/output capability of the second node.

20. The apparatus according to claim 19, wherein the pairing response message comprises a first field, whether the second node has the PSK is indicated by the first field being set as a value in a first group of values, and the input/output capability of the second node is indicated by the first field being set as a value in a second group of values.

21. The apparatus according to claim 19, wherein the pairing response message comprises a first field comprising a plurality of bits;
a first part of the plurality of bits in the first field indicates whether the second node has the PSK; and
a second part of the plurality of bits in the first field indicates the input/output capability of the second node.

22. The apparatus according to claim 19, wherein the pairing response message comprises a first field and a second field;
the first field indicates whether the second node has the PSK; and
the second field indicates the input/output capability of the second node.

23. The apparatus according to claim 17, wherein using the PSK for authentication has a higher priority than using an authentication method corresponding to an input/output capability of the second node or the node pairing apparatus.

24. The apparatus according to claim 17, wherein the at least one memory stores the program instructions for execution by the at least one processor to:
determine that the second node shares the PSK with the node pairing apparatus.

25. The apparatus according to claim 17, wherein the pairing request message comprises an input/output capability (IOC) field, and the IOC field indicates whether the node pairing apparatus has the PSK.

26. The apparatus according to claim 25, wherein one part of bits in the IOC field indicate a first PSK capability value of the node pairing apparatus, and the first PSK capability value indicates whether the node pairing apparatus has the PSK; and another part of bits in the IOC field are used to indicate an output capability of the node pairing apparatus.

27. The apparatus according to claim 17, wherein the pairing request message comprises a PSK capability field, the PSK capability field comprises a PSK capability value of the node pairing apparatus, and the PSK capability value of the node pairing apparatus is used to indicate whether the node pairing apparatus has the PSK; and the pairing request message further comprises an input/output capability (IOC) field, and the IOC field is used to indicate an input/output capability of the node pairing apparatus.

28. The apparatus according to claim 17, wherein the at least one memory stores the program instructions for execution by the at least one processor to:

receive a second authentication parameter from the second node; and verify the second authentication parameter based on the PSK.

29. The apparatus according to claim 28, wherein the at least one memory stores the program instructions for execution by the at least one processor to:

generate a first authentication parameter based on the PSK; and send the first authentication parameter to the second node.

30. The apparatus according to claim 17, wherein the pairing response message comprises a second PSK capability value of the second node, the second PSK capability value is used to indicate that the second node has the PSK, and the at least one memory stores the program instructions for execution by the at least one processor to:

receive a fourth authentication parameter from the second node, wherein the fourth authentication parameter is generated based on the second PSK capability value;

generate a third check parameter based on the second PSK capability value; and determine, based on the third check parameter and the fourth authentication parameter, that an authentication on the second PSK capability value succeeds.

31. The apparatus according to claim 30, wherein the at least one memory stores the program instructions for execution by the at least one processor to:

generate a third authentication parameter based on a PSK capability value of the node pairing apparatus; and send the third authentication parameter to the second node.

32. A node pairing method, applied to a second node, wherein the method comprises:

receiving, by the second node, a pairing request message from a first node, wherein the pairing request message indicates whether the first node has a pre-shared key (PSK) shared with the second node;

sending, by the second node, a pairing response message to the first node in response to the pairing request message, wherein the pairing response message indicates whether the second node has the PSK shared with the first node; and authenticating, by the second node, the first node based on the PSK, in response to that the pairing request message indicates the first node has the PSK and the pairing response message indicates the second node has the PSK.

33. The method according to claim 32, wherein the pairing request message indicates an input/output capability of the first node.

34. The method according to claim 32, wherein the pairing response message indicates an input/output capability of the second node.

35. The method according to claim 34, wherein the pairing response message comprises a first field, whether the second node has the PSK is indicated by the first field being set as a value in a first group of values, and the input/output capability of the second node is indicated by the first field being set as a value in a second group of values.

36. A node pairing method, applied to a first node, wherein the method comprises:

sending, by the first node, a pairing request message to a second node, wherein the pairing request message indicates whether the first node has a pre-shared key (PSK) shared with the second node;

receiving, by the first node, a pairing response message from the second node, wherein the pairing response message indicates whether the second node has the PSK shared with the first node; and authenticating, by the first node, the second node based on the PSK, in response to that the pairing request message indicates the first node has the PSK and the pairing response message indicates the second node has the PSK.

37. The method according to claim 36, wherein the pairing request message indicates an input/output capability of the first node.

38. The method according to claim 36, wherein the pairing response message indicates an input/output capability of the second node.

39. A computer program product comprising computer-executable instructions that are stored on a non-transitory computer-readable medium and that, when executed by at least one processor, cause a node pairing apparatus to:

receive a pairing request message from a first node, wherein the pairing request message indicates whether the first node has a pre-shared key (PSK) shared with the node pairing apparatus;

send a pairing response message to the first node in response to the pairing request message, wherein the pairing response message indicates whether the node pairing apparatus has the PSK shared with the first node; and authenticate the first node based on the PSK in response to that the pairing request message indicates the first node has the PSK and the pairing response message indicates the node pairing apparatus has the PSK.

40. A computer program product comprising computer-executable instructions that are stored on a non-transitory computer-readable medium and that, when executed by at least one processor, cause a node pairing apparatus to:

send a pairing request message to a second node, wherein the pairing request message indicates whether the node pairing apparatus has a pre-shared key (PSK) shared with the second node;

receive a pairing response message from the second node, wherein the pairing response message indicates whether the second node has the PSK shared with the node pairing apparatus; and authenticate the second node based on the PSK in response to that the pairing request message indicates the node pairing apparatus has the PSK and the pairing response message indicates the second node has the PSK.

* * * * *